(12) United States Patent
Sakurada et al.

(10) Patent No.: US 10,860,257 B2
(45) Date of Patent: Dec. 8, 2020

(54) INFORMATION PROCESSING APPARATUS AND INFORMATION PROCESSING METHOD

(71) Applicant: Ricoh Company, Ltd., Tokyo (JP)

(72) Inventors: Daiki Sakurada, Kanagawa (JP); Hideaki Yamamoto, Kanagawa (JP); Hiroyuki Ishihara, Kanagawa (JP); Tomoe Kitaguchi, Kanagawa (JP); Ryuta Aoki, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 46 days.

(21) Appl. No.: 16/140,697

(22) Filed: Sep. 25, 2018

(65) Prior Publication Data

US 2019/0095138 A1 Mar. 28, 2019

(30) Foreign Application Priority Data

Sep. 25, 2017 (JP) .................. 2017-184096
Jul. 11, 2018 (JP) .................. 2018-131722

(51) Int. Cl.
*G06F 3/06* (2006.01)
*G06F 12/02* (2006.01)

(52) U.S. Cl.
CPC .......... *G06F 3/0679* (2013.01); *G06F 3/0604* (2013.01); *G06F 3/0655* (2013.01); *G06F 3/0664* (2013.01); *G06F 3/0673* (2013.01); *G06F 12/0238* (2013.01); *G06F 2212/401* (2013.01)

(58) Field of Classification Search
CPC ............. G06F 2212/401; G06F 12/023; G06F 12/0238; G06F 3/0604; G06F 3/0655; G06F 3/0679; G06F 12/0284; G06F 12/08; G06F 2003/0697; G06F 2212/1044; G06F 3/0601; G06F 3/0664; G06F 3/0673
See application file for complete search history.

(56) References Cited

U.S. PATENT DOCUMENTS 6,542,967 B1 * 4/2003 Major ................. G06F 12/127
711/134
2007/0005911 A1 * 1/2007 Yang .................... G06F 12/023
711/154

(Continued)

FOREIGN PATENT DOCUMENTS

JP 5-120131 5/1993
JP 2003-330770 11/2003
JP 2017-154466 9/2017

*Primary Examiner* — Zhuo H Li
(74) *Attorney, Agent, or Firm* — Harness, Dickey & Pierce, P.L.C.

(57) ABSTRACT

An information processing apparatus includes a RAM; a non-volatile memory storing setting information in which a compression method is set for each of a plurality of RAM disks, the setting information including a plurality of compression methods; and circuitry. The circuitry is configured to create each of the plurality of RAM disks with the compression method mounted, in the RAM, according to the setting information; request writing and reading of data from an application; write the data into a corresponding RAM disk of the plurality of RAM disks corresponding to the application, in response to a writing request of the data from the application; and compress the data in the compression method mounted on the corresponding RAM disk.

14 Claims, 20 Drawing Sheets

(56) References Cited

U.S. PATENT DOCUMENTS

| | | | |
|---|---|---|---|
| 2008/0222181 A1* | 9/2008 | Yoshioka | G06F 3/1222 |
| 2009/0150598 A1* | 6/2009 | Jung | G06F 11/1666 |
| | | | 711/103 |
| 2017/0046261 A1* | 2/2017 | Umeda | G06F 12/0804 |

* cited by examiner

| RAM DISK No. ⌐t1 | COMPRESSION METHOD ⌐t2 | PATH ⌐t3 | SIZE ⌐t4 |
|---|---|---|---|
| 1 | A | /ramdisk0 | 30MB |
| 2 | B | /ramdisk1 | 100MB |
| 3 | C | /ramdisk2 | 50MB |
| 4 | D (NO COMPRESSION) | /ramdisk3 | 20MB |

DATA INFORMATION (150)

| No | DATA TYPE (t151) | COMPRESSION ALGORITHM (t152) |
|---|---|---|
| 1 | DATA 1 | A |
| 2 | DATA 2 | B |
| 3 | DATA 3 | C |
| 4 | DATA 4 | D (NO COMPRESSION) |

FIG. 12

FILE MANAGEMENT INFORMATION (151)

| No | FILE NAME | PATH |
|---|---|---|
| 1 | FILE 1 | ramdisk0/APP NAME |
| 2 | FILE 2 | ramdisk1/APP NAME |
| 3 | FILE 3 | ramdisk2/APP NAME |
| 4 | FILE 4 | ramdisk3/APP NAME |

FIG. 22

| No | DATA TYPE | COMPRESSION ALGORITHM (1) | COMPRESSION ALGORITHM (2) |
|---|---|---|---|
| 1 | DATA 1 | A | A |
| 2 | DATA 2 | B | |
| 3 | DATA 3 | C | |
| 4 | DATA 4 | D (NO COMPRESSION) | |

DATA INFORMATION — 150, t151, t152-1, t152-2

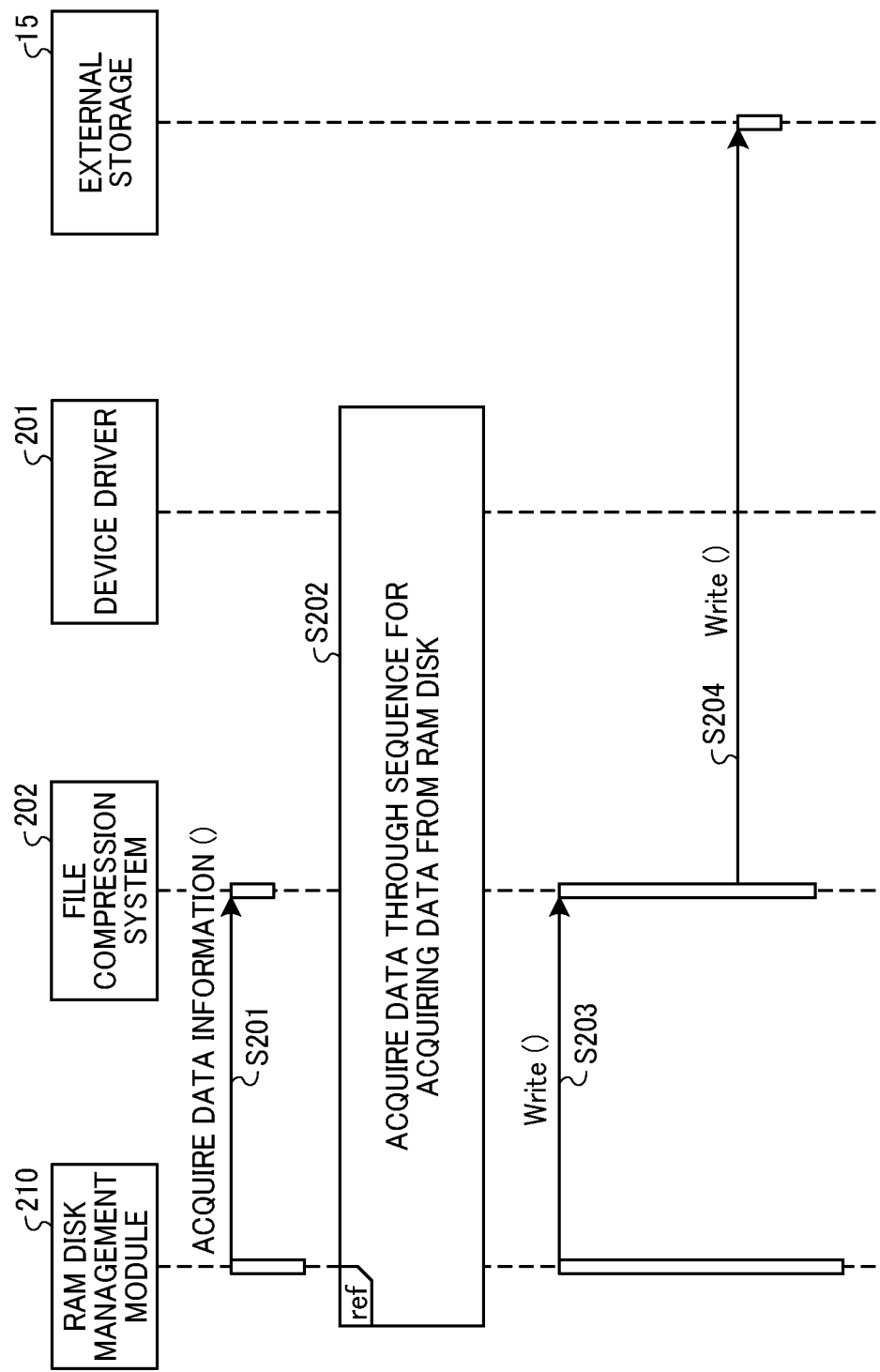

INFORMATION PROCESSING APPARATUS AND INFORMATION PROCESSING METHOD

CROSS-REFERENCE TO RELATED APPLICATIONS

This patent application is based on and claims priority pursuant to 35 U.S.C. § 119(a) to Japanese Patent Application Nos. 2017-184096, filed on Sep. 25, 2017, and 2018-131722, filed on Jul. 11, 2018, in the Japan Patent Office, the entire disclosure of each of which is hereby incorporated by reference herein.

BACKGROUND

Technical Field

The present disclosure relates to an information processing apparatus and an information processing method.

Description of the Related Art

Generally used is a technology of assigning a portion of a main memory to a storage area of a random access memory (RAM) disk and writing data, such as a temporary file, in the storage area. In a case where a mountable memory capacity is limited like an incorporation device, data is compressed to efficiently store required data in the storage area of the RAM disk.

Technologies concerning management of data recording between a main memory and an auxiliary memory are known.

SUMMARY

According to an embodiment of this disclosure, an information processing apparatus includes a RAM; a non-volatile memory storing setting information in which a compression method is set for each of a plurality of RAM disks, the setting information including a plurality of compression methods; and circuitry. The circuitry is configured to create each of the plurality of RAM disks with the compression method mounted, in the RAM, according to the setting information; request writing and reading of data from an application; write the data into a corresponding RAM disk of the plurality of RAM disks corresponding to the application, in response to a writing request of the data from the application; and compress the data in the compression method mounted on the corresponding RAM disk.

According to another embodiment, an information processing apparatus includes a RAM; a non-volatile memory storing setting information in which a compression method of a RAM disk is set; and circuitry. The circuitry is configured to create, in the RAM, the RAM disk mounted with the compression method according to the setting information; request writing and reading of data from an application; write the data into the RAM disk in a compression method corresponding to the data, in response to a writing request of the data from the application, the writing request designating the compression method corresponding to the data; determine whether the compression method designated for the data matches the compression method mounted on the RAM disk; and remount the RAM disk with the compression method designated for the data in response to a determination that the compression method designated for the data does not match the compression method of the RAM disk.

Yet another embodiment provides a method for setting a RAM disk. The method includes acquiring setting information in which a compression method is set for each of a plurality of RAM disks, the setting information including a plurality of compression methods; securing an area for one of the plurality of RAM disks; formatting the area for the one of the plurality of RAM disks; mounting the compression method in the area for the one of the plurality of RAM disks according to the setting information; and performing the securing, the formatting, and the mounting for a number of the plurality of RAM disk.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein:

FIG. 11 illustrates an example configuration of data information according to Variation 1;

FIG. 12 illustrates an example file management information according to Variation 1;

FIG. 22 illustrates an example data configuration of data information according to Variation 4;

FIG. 26 is a sequence chart illustrating an example procedure for saving the data of the RAM disk in an external storage, according to Variation 5.

Figure 1:
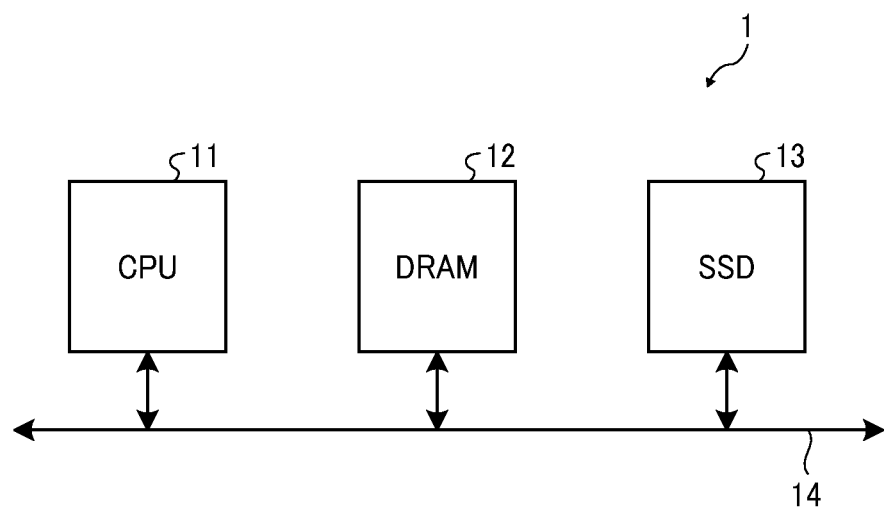
FIG. 1 is a block diagram illustrating an example hardware configuration of an information processing apparatus common to several embodiments according to the present disclosure.

The accompanying drawings are intended to depict embodiments of the present invention and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected, and it is to be understood that each specific element includes all technical equivalents that operate in a similar manner and achieve a similar result.

Referring now to the drawings, wherein like reference numerals designate identical or corresponding parts throughout the several views thereof, and particularly to FIG. 1, an image processing apparatus according to several embodiments of this disclosure is described. As used herein, the singular forms "a", "an", and "the" are intended to include the plural forms as well, unless the context clearly indicates otherwise.

The information processing apparatus according to the present embodiment can be applied to, for example, an information processing apparatus of a multifunction peripheral (MFP) or the like. The main memory of the information processing apparatus can be constructed by a dynamic RAM (DRAM) or the like, and "storing unit" for storing a program and data can be constructed by a solid state drive (SSD), a hard disk drive (HDD), or the like.

FIG. 1 is a block diagram illustrating an example hardware configuration of an information processing apparatus according to the present embodiment. An information processing apparatus 1 illustrated in FIG. 1 includes a central processing unit (CPU) 11, a DRAM 12, and an SSD 13, which are mutually connected via a bus 14. Further, corresponding to a device incorporated (an incorporation device) in the information processing apparatus 1, a controller or the like of the incorporation device is connected thereto. For example, in the case of an MFP, an image processing engine, various communication interfaces, a touch panel, a controller of a liquid crystal (LC) display, and the like are connected.

The CPU 11 is a central processing unit and controls the entire information processing apparatus 1 in a centralized manner. The DRAM 12 is a volatile memory for the CPU 11 to write information in and read information therefrom at high speed. The DRAM 12 is used as a work area of the CPU 11. The SSD 13 is a non-volatile memory and stores various programs and data.

Figure 2:
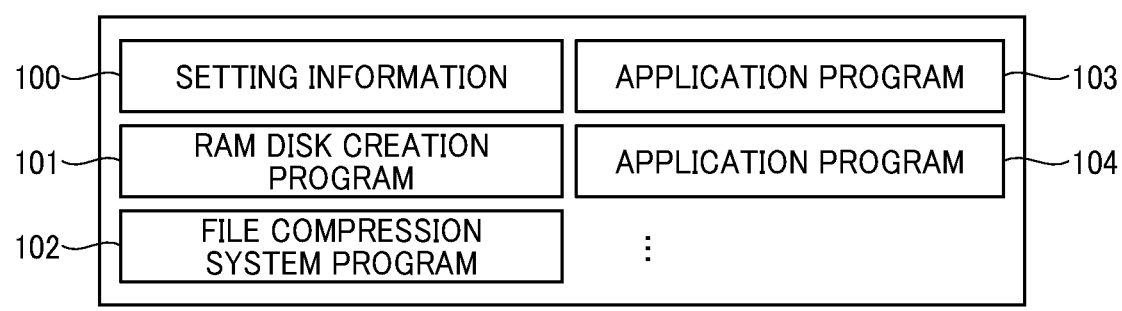
FIG. 2 is a block diagram illustrating an example software configuration of a solid state drive (SSD) according to an embodiment.

FIG. 2 is a block diagram illustrating an example software configuration of the SSD 13. FIG. 2 illustrates an example configuration of software installed in the SSD 13, together with software of an operating system (OS).

Setting information 100 is information in the form of a table including settings for creating a RAM disk.

A RAM disk creation program 101 is a module program that adds, for example, a function to create a RAM disk, to a kernel.

A file compression system program 102 is a file system program having a compression function.

Each of application programs 103, 104, and so on is a program of an application that performs input and output of a file when performing specific processing for a specific function. Such application programs include, for example, programs of applications specific functions such as copying and fax communication of an MFP.

Functional Configuration

Figure 3:
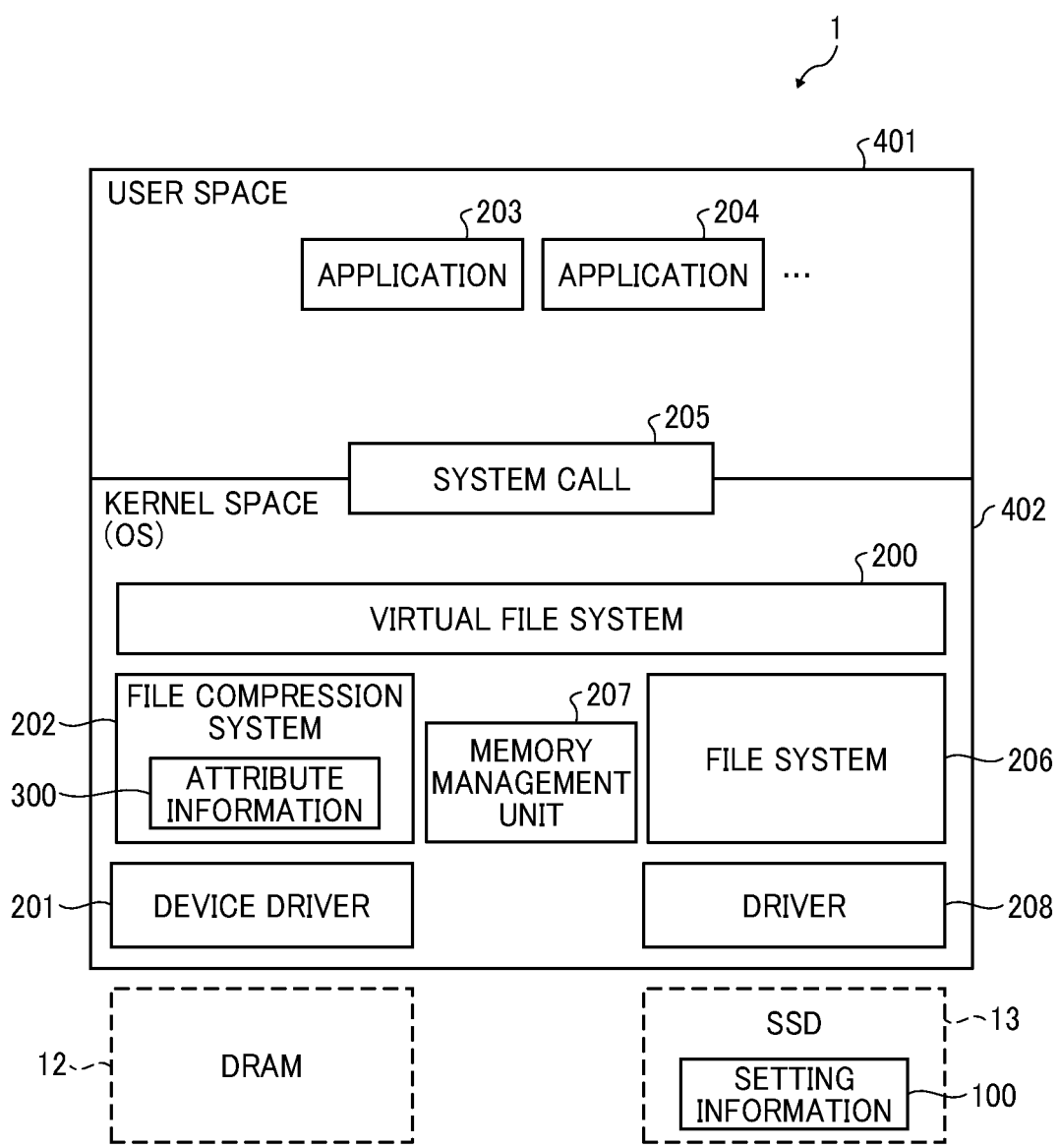
FIG. 3 is a functional block diagram illustrating an example configuration of the information processing apparatus illustrated in FIG. 1.

FIG. 3 is a functional block diagram illustrating a main configuration of the information processing apparatus 1. These functions are implemented as the CPU 11 loads various programs installed in the SSD 13 into the DRAM 12 and executes the loaded programs. Of the functions illustrated in FIG. 3, a device driver 201, a file compression system 202, and applications 203, 204, and so forth are implemented, respectively, as functional units of the RAM disk creation program 101 (see FIG. 2), the file compression system program 102 (see FIG. 2), and the application programs 103, 104, and so forth (see FIG. 2). In addition, various functional units in a kernel space 402 are implemented based on software of the OS, which in this example is a Unix-type Linux (registered trademark), and the like. The applications 203, 204, and so on operate in a user space 401, and other functional units illustrated in FIG. 3 operate in the kernel space 402. Although the DRAM 12 and the SSD 13 are components of the hardware configuration illustrated in FIG. 1, the DRAM 12 and the SSD 13 are illustrated in broken lines in FIG. 3 for ease of understanding, together with the functional units.

Each of the applications 203, 204, and so on requests a system call 205 to perform processing such as writing a file and reading a file. For example, when image editing application software is used in the MFP, the application requests writing and reading out of either a non-compressed file or a compressed file, such as a JPEG (Joint Photographic Experts Group) file or PDF (Portable Document Format, registered trademark) file.

A virtual file system 200 absorbs differences among file systems so that different file systems appear to be one file system from the user space 401.

The file compression system 202 manages a plurality of RAM disk files. Specifically, the file compression system 202 has, individually for each RAM disk, attribute information 300 including the size, the path, and the compression method of the RAM disk and manages, based on each attribute information 300, respective RAM disk files. For example, the file compression system 202 performs processing in the compression method corresponding to the RAM disk designated, by the applications 203, 204, or the like, as a writing destination of a temporary file and writes the processed file in the RAM disk via a device driver 201.

A file system 206 is a different type of file system from the file compression system 202 and is, for example, a file system that is incorporated in the OS in advance.

A memory management unit 207 manages assignment such as reservation of the memory area of the DRAM 12.

The device driver 201 functions as a device driver of "creation unit" according to the RAM disk creation program 101 and the DRAM 12.

A driver 208 functions as a driver of, for example, the SSD 13.

RAM Disk Creation

Next, various processing in the information processing apparatus 1 will be described. First, a procedure for creating a RAM disk will be described. The setting information 100 will be described, and then the creation procedure will be described. In the description below, the number of RAM disks to be created is limited to four, as one example. The number of RAM disks to be created is an example and can be increased or decreased as appropriate.

Figures 4, 5:
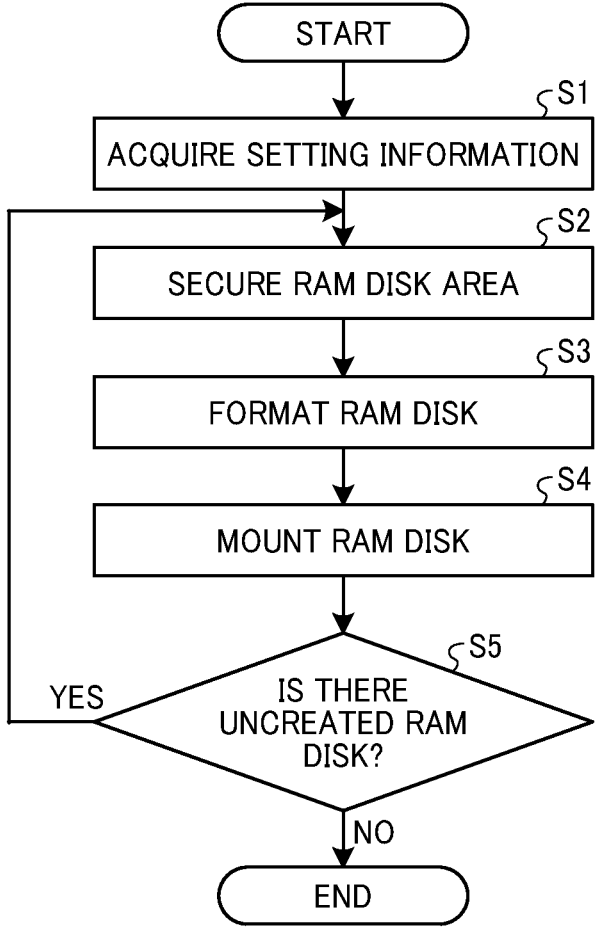
FIG. 4 is a diagram illustrating an example table structure of setting information according to an embodiment.
FIG. 5 is a flowchart illustrating an example procedure for creating a RAM disk according to an embodiment.

FIG. 4 is a diagram illustrating an example table structure of the setting information 100. The setting information 100 illustrated in FIG. 4 associates a RAM disk number t1, a compression method t2, a path t3, and a size t4 with each other.

As the RAM disk number t1, an index number uniquely identifying the RAM disk is set. In this example, "1", "2", "3", and "4" are assigned, as the index numbers, to the four RAM disks, respectively.

As the compression method t2, the compression method of each RAM disk assigned with the number specified as the RAM disk number t1 is set. In FIG. 4, the RAM disks 1 to 3 are assigned to predetermined compression algorithms A to C, respectively, and the RAM disk 4 is assigned to a compression method D representing no compressing.

In the path t3, path information of each RAM disk assigned with the RAM disk number t1 is set.

In the size t4, size information being a disk capacity of each RAM disk assigned with the RAM disk number t1 is set.

FIG. 5 is a flowchart illustrating an example procedure for creating a RAM disk. Here, a flow of operation performed at the system startup of the information processing apparatus 1 will be described. As the information processing apparatus 1 boots and the CPU 11 loads the OS in a predetermined storage area of the DRAM 12, the RAM disk creation program 101 is read. Then, the creation unit for creating a RAM disk is added according to the RAM disk creation program 101.

The creation unit first acquires the setting information 100 (see FIG. 4) stored in the SSD 13 (S1).

Subsequently, the creation unit refers to the size t4 regarding one RAM disk that is not yet created, in the setting information 100 acquired and requests the memory management unit 207 (see FIG. 3) to secure an area of size specified by the size t4, for the RAM disk (S2). The memory management unit 207 secures the area for the RAM disk at an initial stage of startup.

Subsequently, the creation unit formats the area of the RAM disk secured at S2 (S3). In the formatting, the creation unit sets the size information in the attribute information 300 (see FIG. 7) of the file compression system 202 (see FIG. 3) that manages the RAM disk.

Subsequently, the creation unit refers to the path t3 of the setting information 100 and performs a mounting operation to mount the RAM disk (an image of that RAM disk) at a RAM disk mount point set in the path t3 (S4). In the mounting operation, the creation unit sets the compression method specified as the compression method t2 corresponding to the path t3 of the setting information 100 as the compression method for the file compression system 202. Further, during this operation, the creation unit sets the path and the compression method in the attribute information 300 of the file compression system 202 that manages the RAM disk.

Subsequently, the creation unit determines whether or not there remains an uncreated RAM disk in the setting information 100 (S5). In response to a determination that there remains an uncreated RAM disk (Yes at S5), the same process starting from S2 is executed to create another RAM disk.

In this example, a RAM disk assigned with the RAM disk number "1" is created in the first round, a RAM disk assigned with the RAM disk number "2" is created in the second round, a RAM disk assigned with the RAM disk number "3" is created in the third round, and a RAM disk assigned with the RAM disk number "4" is created in the fourth round. At the time of this creation processing, the attribute information 300 of each RAM disk possessed by the file compression system 202 is set.

In response to a determination that there is no RAM disk yet to be created (No at S5), the operation of the creation unit ends.

Memory Map

Figure 6:
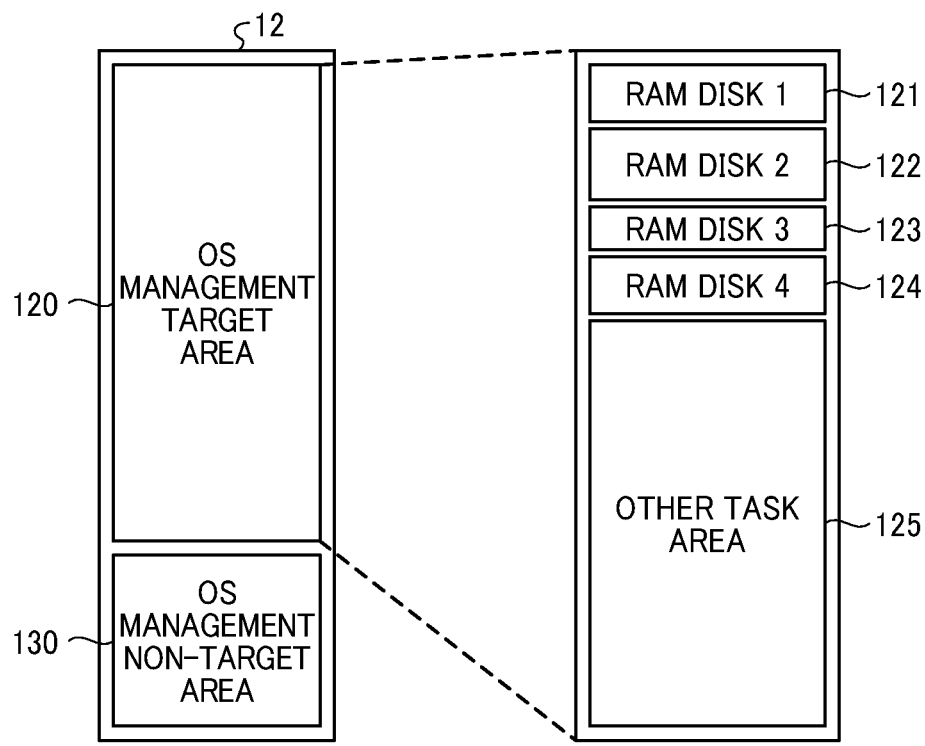
FIG. 6 is a diagram illustrating an example memory map of a storage area of a dynamic RAM (DRAM) managed by a memory management unit according to an embodiment.

FIG. 6 is a diagram illustrating an example memory map about the storage area of the DRAM 12 managed by the memory management unit 207. The memory management unit 207 assigns a plurality of RAM disk areas to the OS management target area 120, of the OS management target area 120 and the OS management non-target area 130 of the DRAM 12 illustrated in FIG. 6. In this example, as the respective RAM disk areas corresponding to the RAM disk numbers 1 to 4, a RAM disk area 121, a RAM disk area 122, a RAM disk area 123, and a RAM disk area 124 are assigned, with RAM disk breaks. The memory management unit 207 assigns a remaining area ("other task area 125" in FIG. 6) of the OS management target area 120, other than the RAM disk areas, to task processing and the like.

Attribute Information

Figure 7:
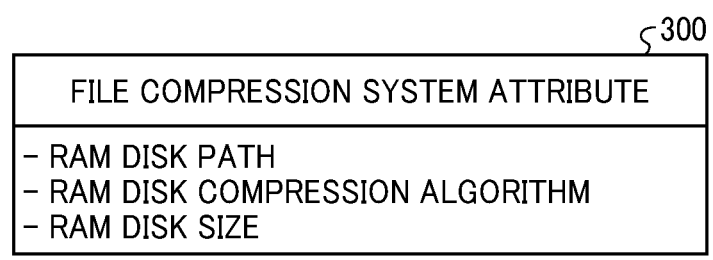
FIG. 7 illustrates an example attribute information according to an embodiment.

FIG. 7 illustrates an example of the attribute information 300. The attribute information 300 is set by the RAM disk creation illustrated in FIG. 5, at the startup. As illustrated in FIG. 7, the attribute information 300 includes the path information, the compression method (compression algorithm), and the size information of each RAM disk.

Processing of Application Temporary File

Figure 8:
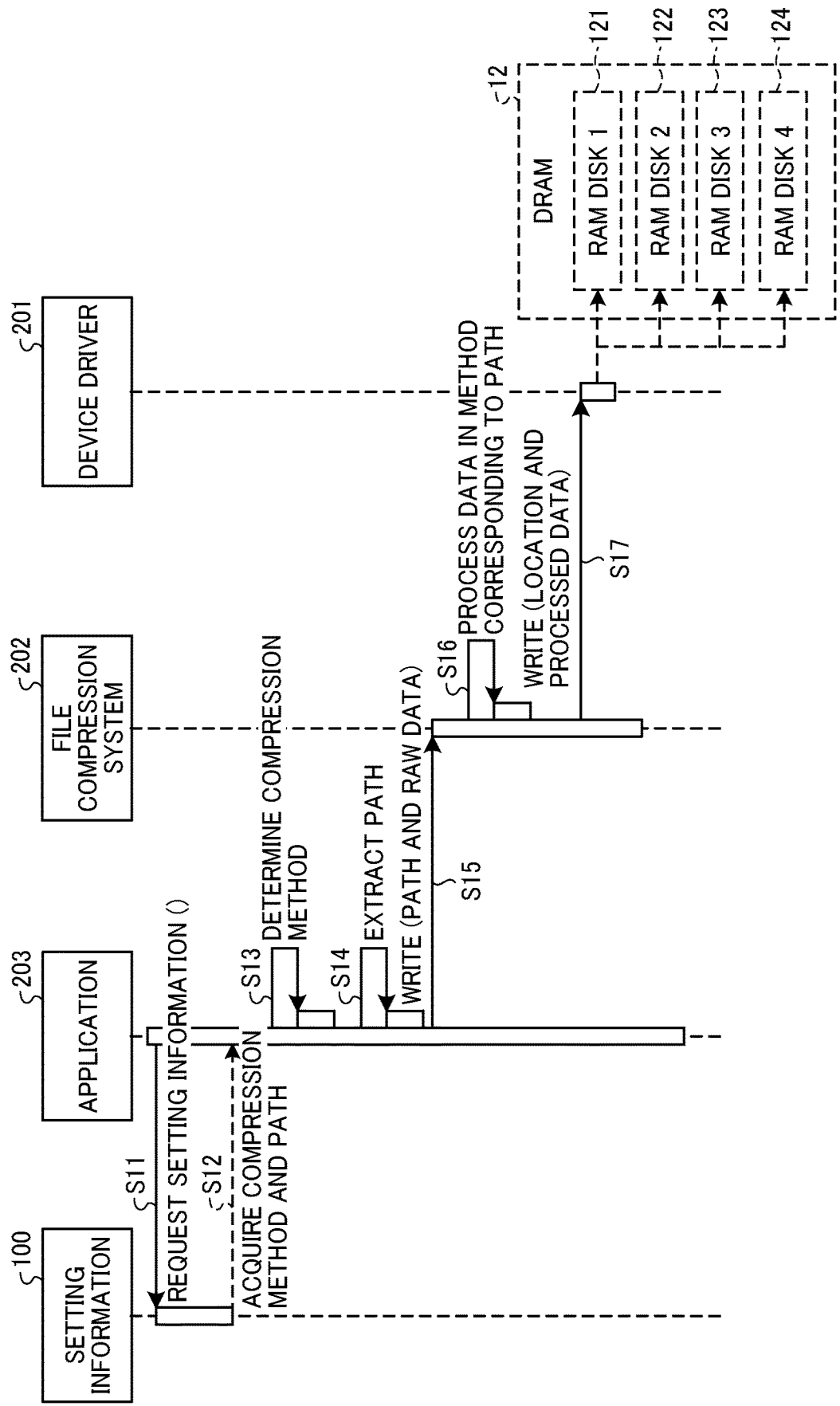
FIG. 8 is a sequence chart illustrating an example procedure for writing a temporary file of an application in a RAM disk area in the information processing apparatus illustrated in FIG. 3.

Descriptions are given below of a procedure for writing a temporary file of each of the applications 203, 204, and so on (see FIG. 3) into the RAM disk areas 121, 122, 123, and 124 (see FIG. 6) of the DRAM 12 and a procedure of reading the temporary file with the application 203, 204, or the like. Although the application 203 is used in the description below, the following procedure applies to the applications 203, 204, and so on. For ease of understanding, FIG. 8 illustrates main functional blocks of the functional blocks illustrated in FIG. 3. Operation of other functional blocks are mentioned appropriately in the description below.

FIG. 8 is a sequence chart illustrating an example procedure for writing temporary files of the application 203 in the RAM disk areas 121, 122, 123, and 124. As illustrated in FIG. 8, the application 203 acquires the setting information 100 at S11 and S12. Specifically, the application 203 requests the setting information 100 via the system call 205 (see FIG. 3) at S11, and acquires the compression method and the path, of the setting information 100, from the SSD 13 at S12.

At S13, the application 203 determines whether or not the file requires compression based on the nature (e.g., extension) of the temporary file to be output. In other words, the application 203 determines the compression method. At S14, the application 203 extracts the path of the RAM disk corresponding to the compression method from the acquired setting information 100. Specifically, in the case where the file requires compression, the application 203 selects, from the compression algorithms A to C specified as the compression methods t2 of the setting information 100, an optimum algorithm for that file and extracts, from the paths t3, the path corresponding to the selected compression algorithm. For example, in the case of outputting text data, the application 203 determines that the optimum algorithm is one with a highest compression ratio, of the compression algorithms A to C. In the case where the file does not require compression, the application 203 extracts, from the paths t3, the path corresponding to "D (no compression)" in the compression method t2 of the setting information 100.

Subsequently, the application 203 transmits the path corresponding to the compression method and raw data of the temporary file to the system call 205, together with a request to write the temporary file into the RAM disk. Note that, in each subsequent request to write a temporary file, similarly, the application 203 forwards the compression algorithm corresponding to the path extracted at S14, to the system call 205. In response to the write request, the file compression system 202 writes a temporary file into the RAM disk as follows.

At S15, the file compression system 202 accepts a notification of the write request accompanied with the path corresponding to the compression method and the temporary file raw data, transmitted from the application 203 to the system call 205. At S16, the file compression system 202 processes the raw data in the compression method corresponding to the notified path based on the own attribute information 300 of the file compression system 202. For example, in the case where the path of the compression method transmitted from the application 203 is "/ramdisk0" of the path t3 (see FIG. 4), the file compression system 202 converts the raw data according to the compression algorithm A corresponding thereto. In the case of "/ramdisk1", the file compression system 202 compresses the raw data by the compression algorithm B. In the case of "/ramdisk2", the file compression system 202 compresses the raw data by the compression algorithm C. In the case of "/ramdisk3", the file compression system 202 omits the compression of the raw data based on the compression method D (no compression).

At S17, the file compression system 202 stores (writes), via the device driver 201, the processed data in one of the RAM disk areas 121, 122, 123, and 124 corresponding to the path of the compression method transmitted from the application 203.

Figure 9:
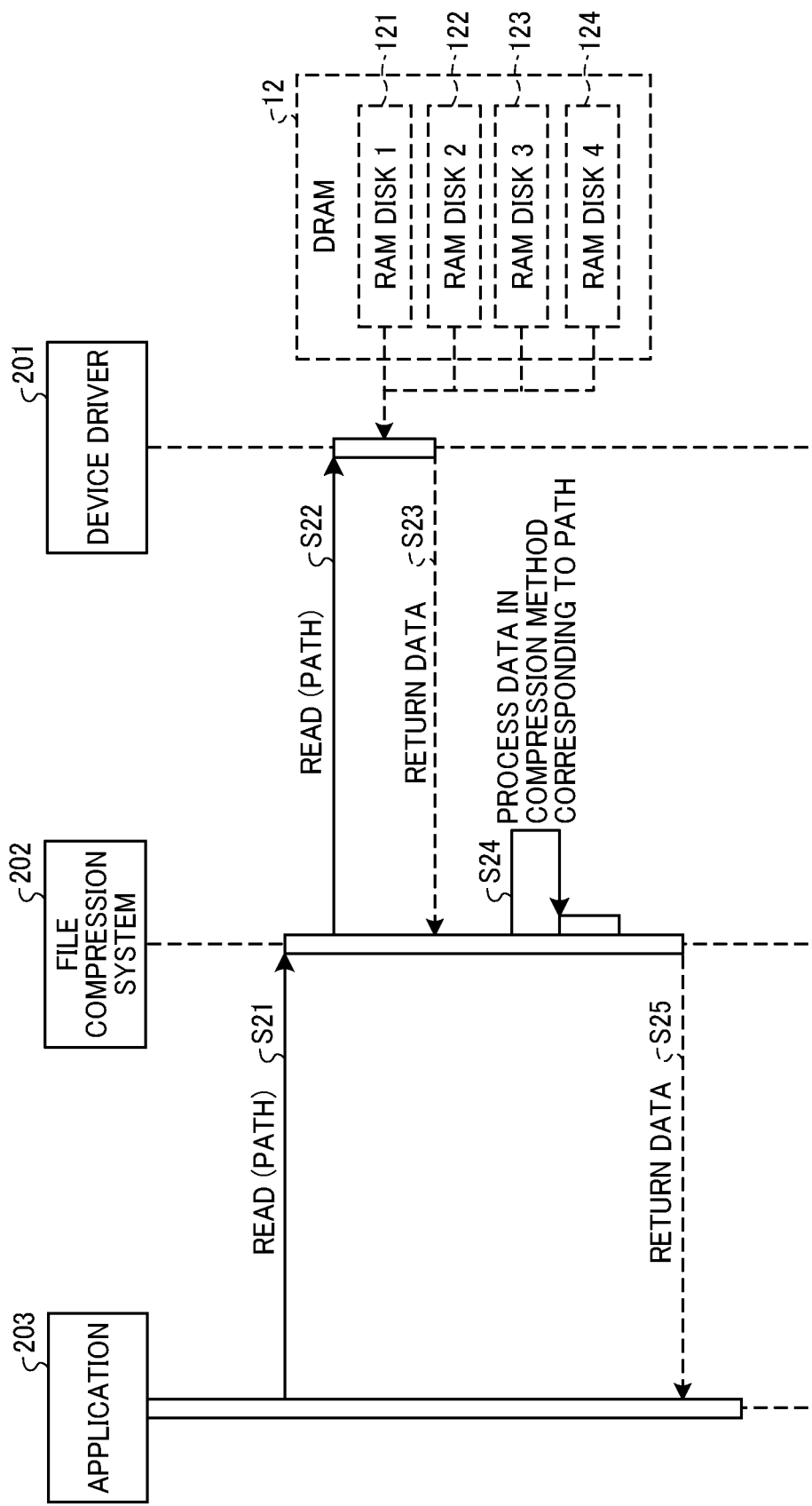
FIG. 9 is a sequence chart illustrating an example procedure for reading out a written temporary file by the application in the information processing apparatus illustrated in FIG. 3.

FIG. 9 is a sequence chart illustrating an example procedure for the application 203 to read (acquire) the written temporary file. As illustrated in FIG. 9, at S21, the application 203 designates the path and requests reading of the file. Specifically, the application 203 issues a read request via the system call 205.

At S22, based on the path designated by the read request, the file compression system 202 instructs the device driver 201 to read the data from one of the RAM disk areas 121, 122, 123, and 124 corresponding to the instructed path. At S23, the device driver 201 retrieves the data, and the file compression system 202 acquires the read data from the device driver 201.

At S24, the file compression system 202 determines the compression method based on the attribute information 300 thereof and processes the read data. For example, in the cases of compression algorithms A, B, and C, the file compression system 202 decompress the compressed data by the respective algorithms. In the case of the compression method D (no compression), the file compression system 202 omits the decompression of the read data.

Subsequently, the application 203 receives the decompressed file from the file compression system 202 (S25). Specifically, the file is returned from the file compression system 202 via the system call 205.

As described above, in the present embodiment, since an optimum compression algorithm is selected according to the nature of data (application), or compression and decompression is omitted for an already-compressed data, an optimum compression method can be performed according to the nature of the data (application). Further, since a RAM disk storage area is assigned per compression method, the size of the RAM disk storage area can be made different according to the nature of the data (or data type), and the storage area can be efficiently used. Compared with an SSD, a DRAM has higher throughput and imposes a greater computation load on a CPU. Compression and decompression of already-compressed data, which is not expected to attain a good compression effect, can be omitted, thereby reducing the computation load. Since temporary data to be written frequently can be written into the RAM disk area of the DRAM, shortening of the service life of the SSD caused by writing of temporary data can be inhibited.

Although the description above concerns an example in which the application 203, 204, or the like in the user space 401 determines whether to compress data, alternatively, the file compression system 202 or the like may perform such determination in the kernel space 402.

Variation 1

In the above-described embodiment, a file is written and read out using a compression algorithm suitable for each application. By contrast, in Variation 1, each application includes a designation unit to designate a compression algorithm according to the nature of data at the time of writing a file. Note that, in the description below, mainly the differences from the above-described embodiment will be described, and illustration and description similar to those of the above-described embodiment will be omitted. The description using the application 203 as an example applies to the applications 204 and the like.

Figure 10:
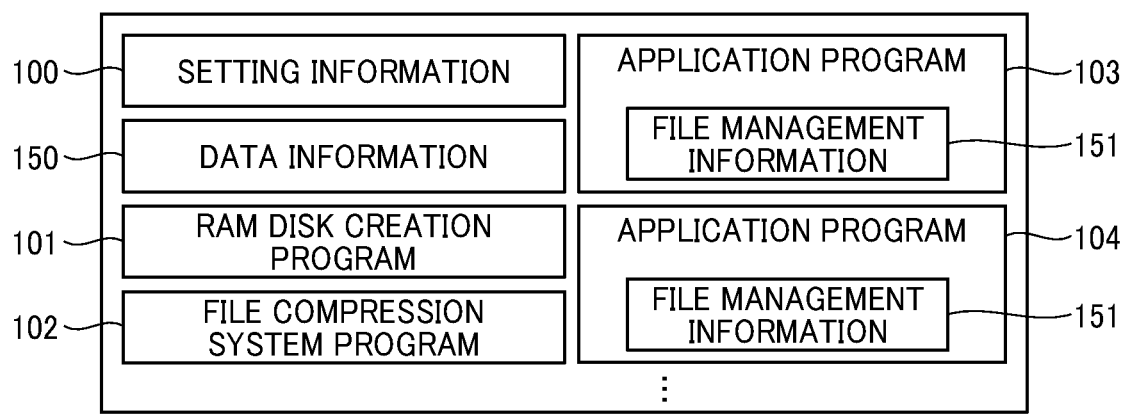
FIG. 10 is a diagram illustrating an example software configuration of an SSD according to Variation 1.

FIG. 10 is a diagram illustrating an example software configuration of the SSD 13 according to Variation 1. The configuration illustrated in FIG. 10 includes data information 150 and file management information 151 in addition to the software configuration illustrated in FIG. 2, according to the above-described embodiment. The data information 150 is information in which a plurality of data types and compression algorithms are associated with each other. The file management information 151 is for each of the applications 203, 204, and so on (see FIG. 3) to manage the file and the path of the RAM disk in association with each file name. Each of the applications 203, 204, and so on is provided with the file management information 151 and sets the file management information 151 appropriately at the time of writing or reading the file.

FIG. 11 illustrates an example data configuration of the data information 150. As illustrated in FIG. 11, in the data information 150, a data type t151 is associated with a compression algorithm t152. As the data type t151, information indicating the nature of the data is specified. Specifically, the information being the data type t151 indicates a nature (data type) of that data discriminated from the raw data by the application 203, 204, or the like. For example, the information indicates whether the data is text data or image data. As the compression algorithm t152, a compression algorithm optimum for the data type set in the data type t151 is set.

For example, in the case of text data, information indicating text data is set as the data type t151, and a compression algorithm suitable for compressing text data is set as the compression algorithm t152. In the case of already-compressed data such as JPEG image data, further compression of the data leads to waste of resources. For this reason, as for the data designated as "compressed data" as the data type t151, "no compression" is set as the compression algorithm t152, not to compress the data.

FIG. 12 illustrates an example of the file management information 151 of one of the applications 203, 204, and so on. As illustrated in FIG. 12, in the file management information 151, a file name and a path are associated with each other.

The example illustrated in FIG. 12 is for a state after data writing to the RAM disk and data reading from the RAM disk are performed a plurality of times. Specifically, FIG. 12 illustrates a state of the file management information 151 of the application (e.g., the application 203) after that application (e.g., the application 203) writes a file 1 in the RAM disk area 121 (see FIG. 6), a file 2 in the RAM disk area 122 (see FIG. 6), a file 3 in the RAM disk area 123 (see FIG. 6), and the file 4 in the RAM disk area 124 (see FIG. 6). The path is in the form of "ramdisk */application name/file name" for uniqueness. It is assumed that each of the applications 203, 204, and so on can freely use a directory under the application name thereof.

The application according to Variation 1 includes the designation unit for designating a compression algorithm according to the nature of the data to be written at the time of writing the file. The designation unit specifies the compression algorithm based on, for example, the result of determination made by a determination unit for determining the nature of the data to be written. The determination unit discriminates among, for example, text data, image data, and the like. The designation unit uses the data information 150, the setting information 100, and the like to designate the compression algorithm. Descriptions are given below of a sequence of writing and reading of a temporary file in the RAM disk in the information processing apparatus 1 according to Variation 1. Although the application 203 will be described as an example, the same applies to the applications 204 and the like.

Figure 13:
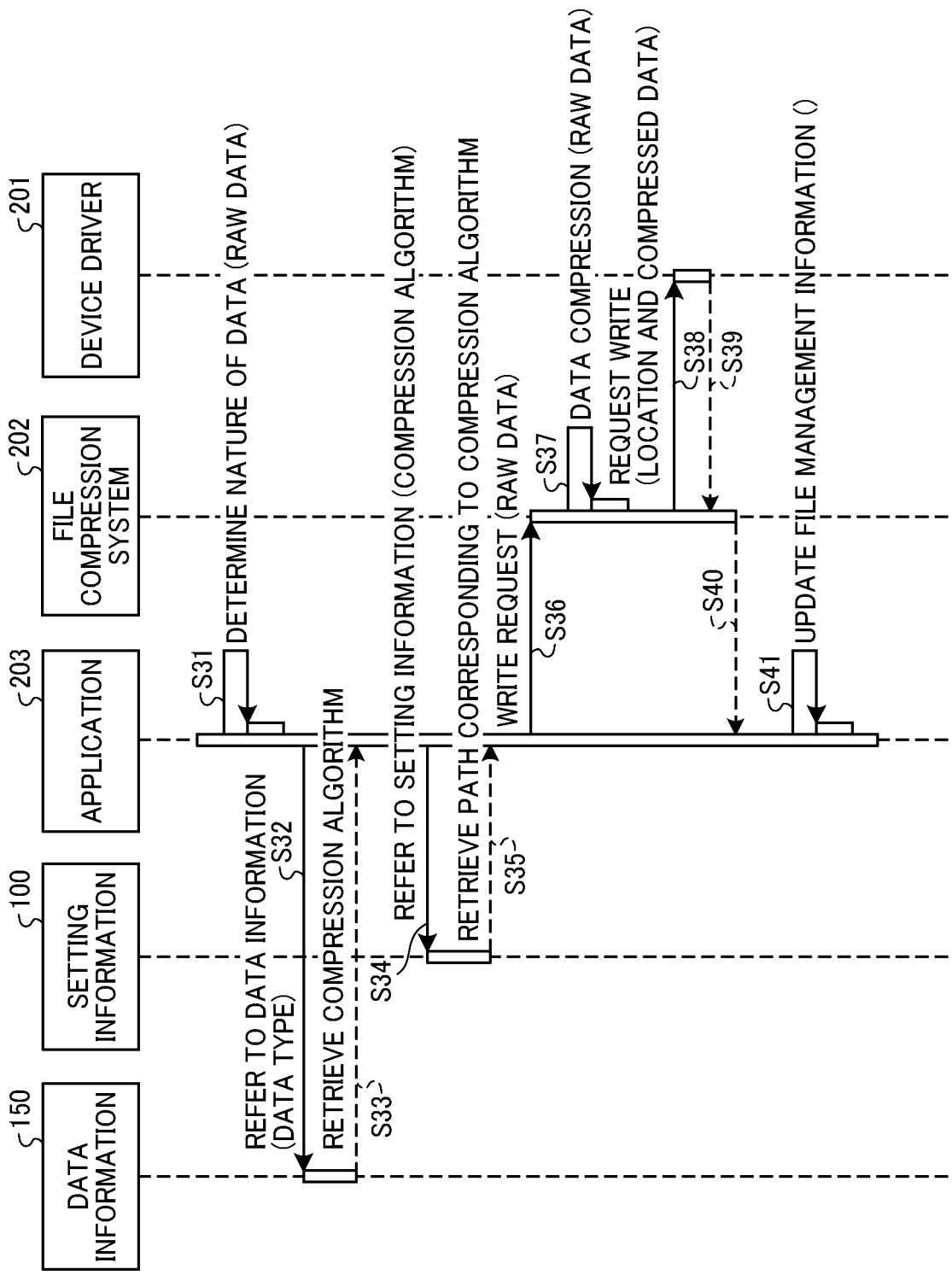
FIG. 13 is a sequence chart illustrating an example procedure for writing a temporary file of an application in the RAM disk area according to Variation 1.

FIG. 13 is a sequence chart illustrating an example procedure for writing temporary files of the application 203 to the RAM disk areas 121, 122, 123, and 124. In FIG. 13, illustration of the RAM disk areas 121, 122, 123, and 124 is omitted for simplicity.

First, the application 203 determines the nature of data to be written from the raw data (S31).

Subsequently, the application 203 acquires information indicating the compression algorithm corresponding to the nature of the data from the data information 150 (S32 and S33).

Subsequently, the application 203 acquires, from the setting information 100, the path to the RAM disk corresponding to the compression algorithm acquired at S32 and S33 (S34 and S35).

At S36, the application 203 issues a writing request using the RAM disk path acquired at S34 and S35. Specifically, the application 203 requests writing of the data in the path of the directory structure of "RAM disk */application name/file name".

In response to a reception of the data write request, the file compression system 202 compresses the data according to the setting of the attribute information 300 thereof (S37). Specifically, the file compression system 202 compresses the data according to the compression algorithm corresponding to the path of the RAM disk to which the application 203 have requested data writing. When the RAM disk to which the write request is made is set as "no compression" in the attribute information 300, the file compression system 202 does not compress the data. Not compressing is one process of the compression processing.

Subsequently, according to the setting of the attribute information 300 thereof, the file compression system 202 writes the compressed data into the RAM disk corresponding to the data compression method via the device driver 201 (S38 and S39).

In response to completion of data writing by the file compression system 202 (S40), the application 203 additionally sets the file name and the path of the data, thereby updating the file management information 151 thereof (S41).

This example explains a sequence of operation for one application to write data assigned with one file name into the RAM disk. A similar operation applies to a case where the same application writes data of another file name into the RAM disk. In other words, when one application handles data of different types, the compression methods can differ between the data of different types, and the data compressed in one compression method and data compressed in another compression method are written into different RAM disks.

Figure 14:
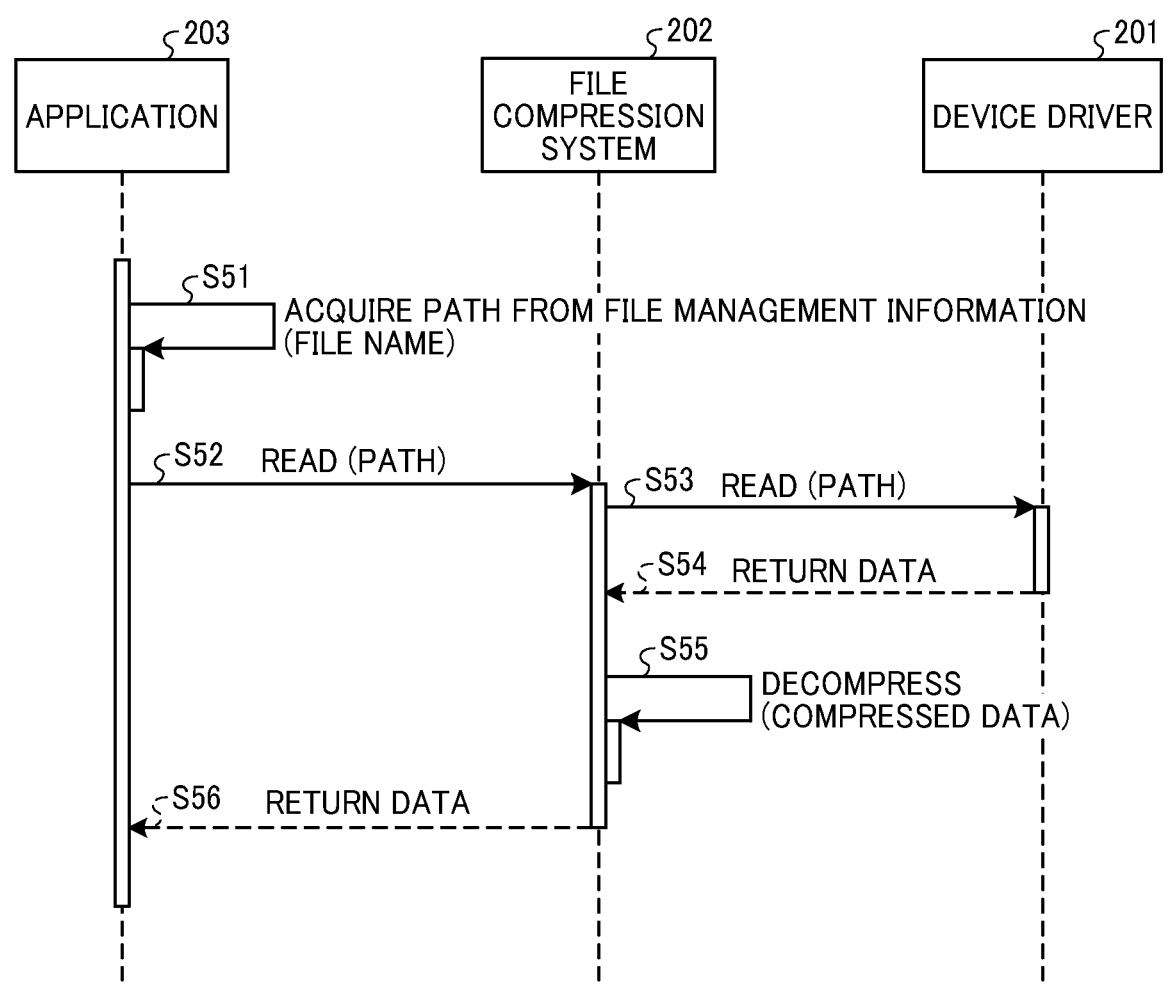
FIG. 14 is a sequence chart illustrating an example procedure for the application to acquire data of a temporary file written in the RAM disk according to Variation 1.

FIG. 14 is a sequence chart illustrating an example procedure for the application 203 to acquire data of a temporary file written in the RAM disk. In FIG. 14, illustration of the RAM disk areas 121, 122, 123, and 124 is omitted.

At S51, the application 203 acquires, from the file management information 151 thereof, a path corresponding to a file name to be acquired (see FIG. 12).

Subsequently, the application 203 requests reading of the data in the acquired path (S52).

In response to a reception of the read request from the application 203, the file compression system 202 refers to the attribute information 300 thereof for the above-mentioned path and reads (returns) the data in the path from the RAM disk via the device driver 201 (S53 and S54).

Subsequently, the file compression system 202 decompresses the data with the compression algorithm corresponding to the above-mentioned path of the attribute information 300 thereof (S55). At this time, when the attribute information 300 indicates "no compression", the file compression system 202 does not decompress the data in the above-mentioned path. The process of not decompressing the data is one process of the decompression processing.

The application 203 receives the decompressed data returned from the file compression system 202 (S56).

Effect of Variation 1

As described in Variation 1, one process can involve various data formats. In that case, if the number of compression algorithms available for the application is one, the same compression algorithm is used for all the data handled by the application. In that case, selecting an appropriate compression algorithm for all data is difficult. For example, it is possible that "all data" includes data that has been already compressed and is not expected to be further compressed. If such data is compressed, the computation load of the CPU will increase.

However, according to Variation 1, the application can designate an optimum compression algorithm according to the nature of data. Such configuration can reduce the load on the CPU and promote compression processing efficiency, thereby increasing the amount of data to be written in the DRAM. Therefore, the amount of data written in the DRAM can be balanced with the computation load on the CPU.

Variation 2

Certain data may reside long (hereinafter "long-stay data") in the RAM disk. The information processing apparatus can be configured to delete or move such long-stay data when the free area in the RAM disk is less than a predetermined amount so that new data can be written therein. The predetermined amount can be empirically obtained and stored in a memory. Note that, in the description below, mainly the differences from the above-described embodiment and Variation 1 will be described, and illustration and description similar to those of the above-described embodiment and Variation 1 will be omitted.

Figure 15:
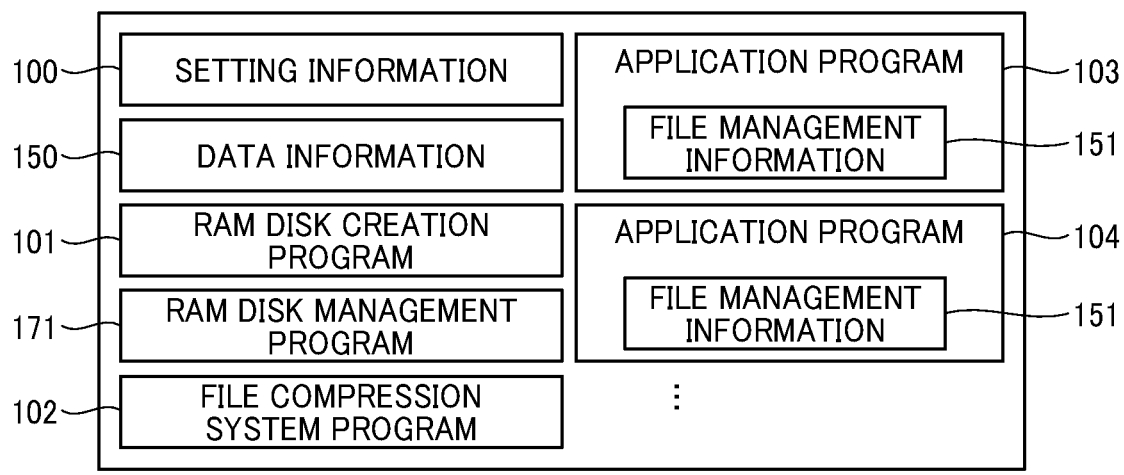
FIG. 15 is a diagram illustrating an example software configuration of an SSD according to Variation 2.

FIG. 15 is a block diagram illustrating an example software configuration of the SSD 13 according to Variation 2. The software configuration of the SSD 13 according to Variation 2 further includes the data information 150, the file management information 151, and a RAM disk management program 171 in addition to the above-described software configuration illustrated in FIG. 2. The data information 150 and the file management information 151 are the same as those according to Variation 1 and illustrated in FIG. 11 and FIG. 12, respectively. Therefore, a detailed description thereof is omitted.

The RAM disk management program 171 is a module program to add a function (a management unit) for managing the RAM disk to the kernel.

In Variation 2, as an example, the SSD 13 includes the data information 150 and the file management information 151, but Variation 2 can be embodied even if these are not included therein.

The procedure of creating a RAM disk in the information processing apparatus 1, the procedure of writing a temporary file into the RAM disk by each application, the procedure of acquiring the file from the RAM disk, and the like according to Variation 2 are similar to those according to Variation 1. Variation 2 is different from the above-described embodiment and Variation 1 mainly in the operation of the entire information processing apparatus 1 according to the RAM disk management program 171. The operation of the entire information processing apparatus 1 according to the RAM disk management program 171 will be described in detail below.

Figure 16:
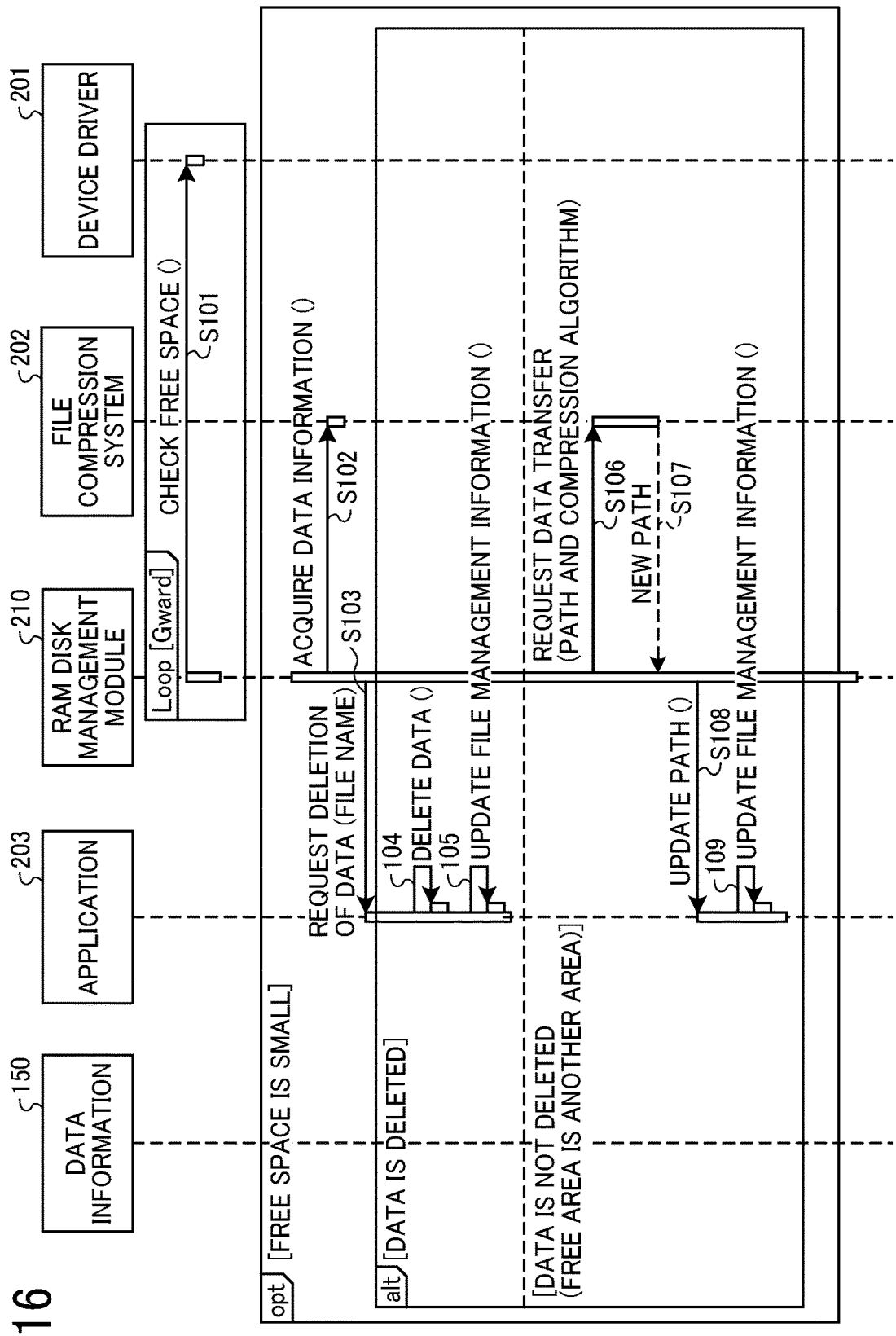
FIG. 16 is a sequence chart for explaining an operation of the RAM disk management module in the information processing apparatus according to Variation 2.

(RAM Disk Management Module) A RAM disk management module 210 (an example of "management unit") illustrated in FIG. 16 is implemented by the CPU 11 loading and executing the RAM disk management program 171 (see FIG. 15) in the DRAM 12.

(Operation by RAM Disk Management Program)

FIG. 16 is a sequence chart for explaining an operation of the RAM disk management module 210 in the information processing apparatus 1. FIG. 16 illustrates a sequence of operations in the entire information processing apparatus 1 when the RAM disk management module 210 secures a free data area in the RAM disk area 121, 122, 123, or 124 (see FIG. 6). In FIG. 22, illustration of the RAM disk areas 121, 122, 123, and 124 is omitted.

First, the RAM disk management module 210 checks the free space of each of the RAM disk areas 121, 122, 123, and 124 to the device driver 201 at predetermined intervals (S101).

Assume that the RAM disk management module 210 determines that the free space of any one of the RAM disk areas 121, 122, 123, and 124 is smaller than the predetermined amount at S101. In that case, the RAM disk management module 210 checks whether there is long-stay data (staying for a period exceeding a threshold time) in the RAM disk area whose free space is smaller than the predetermined amount and acquires the data information (long-stay data) from the file compression system 202 (S102). The threshold time can be empirically obtained and stored in a memory.

Subsequently, the RAM disk management module 210 performs, separately, processes of deleting the data and processes of not deleting the data. Whether or not to delete data is determined depending on, for example, whether there is enough free area in another RAM disk area or whether the currently designated compression algorithm can be changed to a compression algorithm with a higher compression ratio. If changing the algorithm is feasible, the RAM disk management module 210 moves the data to another RAM disk area without deleting the data.

First, the processes of deleting data will be described. In the case of deleting data, the RAM disk management module 210 notifies the application (e.g., the application 203) that has written the long-stay data of a file name of the long-stay data and requests deletion of the data (S103). In response to the request, the application 203 deletes the data (S104) and updates the setting of that data in the file management information 151 thereof (S105).

By contrast, when the data is not deleted, the RAM disk management module 210 transfers (moves) the data at S106 and S107. Specifically, at S106, the RAM disk management module 210 requests the file compression system 202 to move the long-stay data acquired at S102 and notifies the file compression system 202 of the path and the compression algorithm. At S107, the file compression system 202 notifies the RAM disk management module 210 of the new path after moving of the data. In the above-described sequence of processes, the file compression system 202 compresses the decompressed long-stay data with a compression algorithm for another RAM disk area and writes the recompressed data in that RAM disk area.

Then, the RAM disk management module 210 instructs the application 203, which has written the long-stay data, to update the path of the moved long-stay data (S108). Thus, the application 203 updates the setting of the long-stay data in the file management information 151 (S109).

In this example, deleting the long-stay data is explained using an example where the application 203 deletes the data in response to the reception of a data deletion request from the RAM disk management module 210. Alternatively, the application 203 can delete the data after determining whether the data can be deleted. When the application 203 determines that the data deletion is not feasible, the application 203 notifies the RAM disk management module 210 of not deletable. Then, the RAM disk management module 210 instructs the file compression system 202 to write the data and acquires, from the file compression system 202, another long-stay data different from the data that is not deletable.

Effect of Variation 2

Long-stay data in the RAM disk weighs the capacity of the RAM disk and limits the amount of data that can be written to the RAM disk. Since the RAM disk is a volatile memory, data in the RAM disk will disappear when the power is turned off. However, according to Variation 2, when there is data staying long in the RAM disk, the data on the RAM disk is deleted or moved to another RAM disk area, thereby increasing the amount of data writable in the RAM disk area having a small free area.

Variation 3

The information processing apparatus can be configured to actively change the compression algorithm for a given RAM disk. In a configuration described below, the RAM disk is set again (remounted) with a different compression algorithm assigned, to use the same RAM disk area selectively with a plurality of compression algorithms. Described below is one example in which the number of RAM disk area is one, and a plurality of processes uses the same RAM disk area. Note that, in the description below, mainly the differences from the above-described embodiment and other variations will be described, and illustration and description similar to those of the above-described embodiment and other variations will be omitted.

The software configuration of the SSD 13 according to Variation 3 further includes the data information 150 (illustrated in FIG. 11) in addition to the above-described software configuration illustrated in FIG. 2. Further, the setting information 100 (see FIG. 4) and the RAM disk creation program 101 are different between the above-described embodiment and Variation 3. Specifically, the setting information 100 according to Variation 3 includes a setting for only one RAM disk, for example, the RAM disk 1 in the setting information 100 illustrated in FIG. 4. The RAM disk creation program 101 includes, in addition to a program for creating the RAM disk, a program for remounting the RAM disk and mount information. The mount information is information indicating a mount state of the RAM disk and is used by the RAM disk creation program 101.

Similar to the above-described embodiment and variations thereof, in the information processing apparatus 1 according to Variation 3, the creating unit creates the RAM disk based on the setting information 100. In Variation 3, since the setting information 100 has the setting of only one RAM disk, one RAM disk is created in the DRAM 12. A RAM disk remounting module 209 (an example of "setting change unit") illustrated in FIG. 21, which will be described later, remounts the created one RAM disk with a compression algorithm corresponding to the data during writing of the data.

Figure 17:
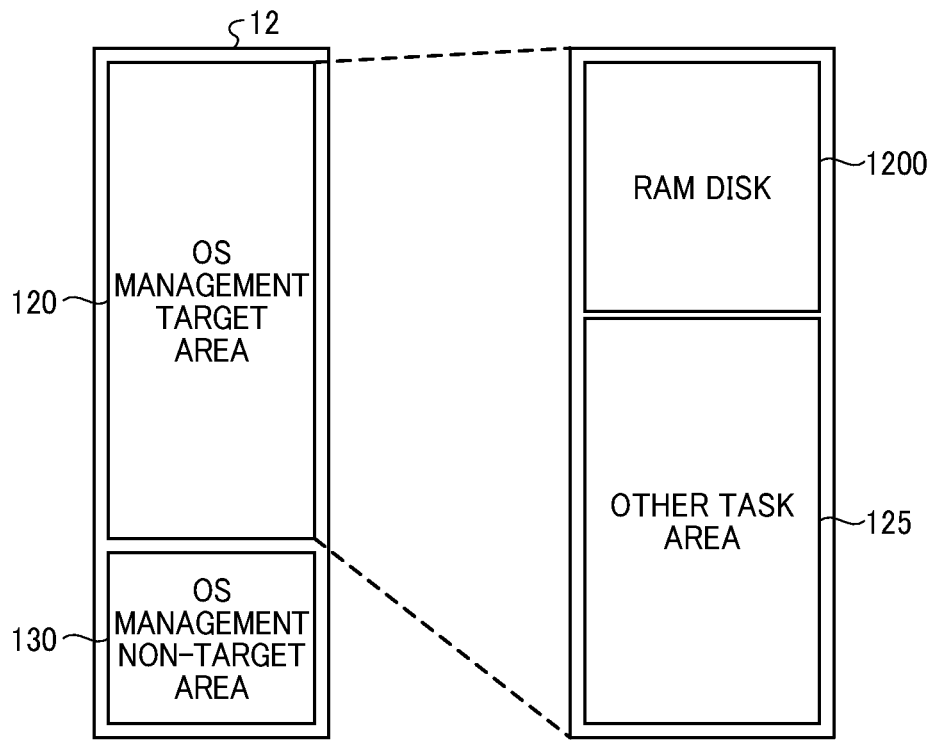
FIG. 17 illustrates an example memory map of the DRAM according to Variation 3.

FIG. 17 illustrates an example memory map of the DRAM 12 according to Variation 3. As illustrated in FIG. 17, in Variation 3, one RAM disk area 1200 is assigned to the OS management target area 120.

Mount Information

The mount information includes RAM disk initialization information set at the time of initialization and RAM disk update information updated at each remounting. The mount information is a part of "setting change unit".

Figure 18:
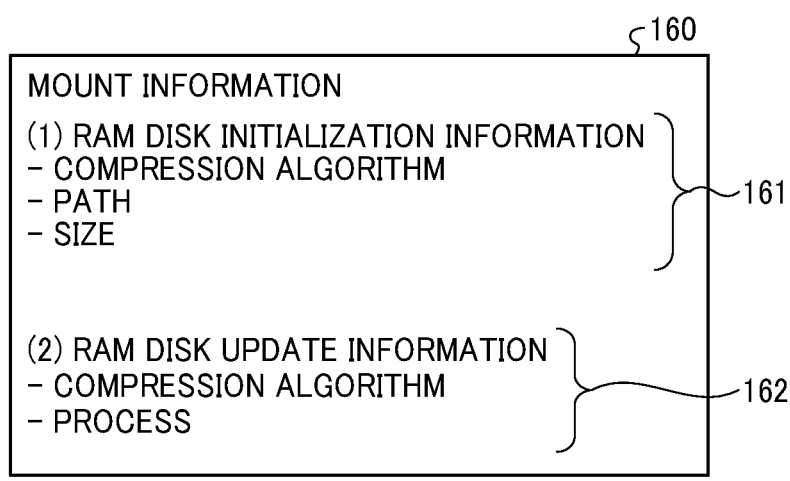
FIG. 18 illustrates an example of mount information according to Variation 3.

FIG. 18 illustrates an example of the mount information according to Variation 3. Mount information 160 illustrated in FIG. 18 includes RAM disk initialization information 161 and RAM disk update information 162 (current RAM disk information).

In the RAM disk initialization information 161, a compression algorithm of the RAM disk at the creation of the RAM disk and one set of information including the path and the size are set.

In the RAM disk update information 162, a compression algorithm remounted for the RAM disk and a process (process name or the like) that has requested remounting (remount request source) are set. The RAM disk update information 162 is overwritten by latest information each time the RAM disk is remounted.

Figure 19A:
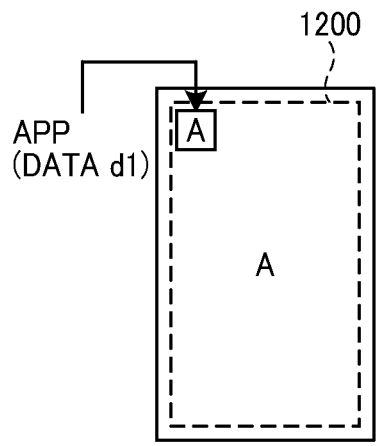
FIGS. 19A, 19B, and 19C are diagrams illustrating an example of transition of state of the RAM disk when remounting is repeated, according to Variation 3.
Figure 19B:
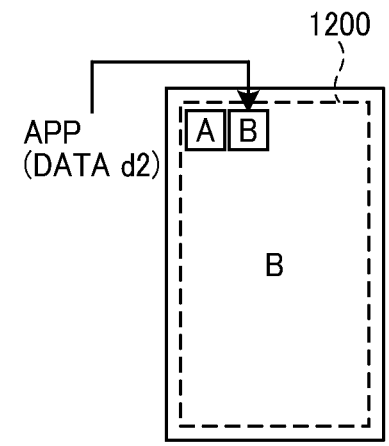
Figure 19C:
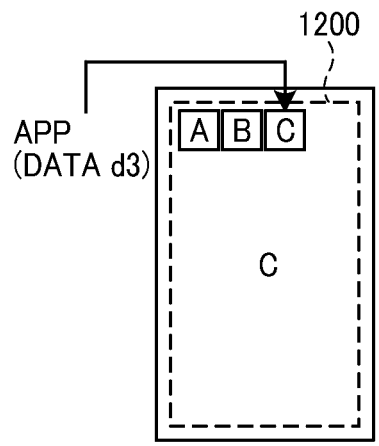

FIGS. 19A, 19B, and 19C are diagram illustrating an example of transition of state of the RAM disk when remounting is repeated. The state of the RAM disk area 121 changes in the order of FIG. 19A, FIG. 19B, and FIG. 19C.

FIG. 19A illustrates an example where the RAM disk area 1200 is mounted with the compression algorithm A at the time of initialization. FIG. 19A illustrates a state in which data d1 compressed by the compression algorithm A is written in the RAM disk area 1200 after the compression algorithm A is mounted.

At the time of initialization, the RAM disk initialization information 161 of the mount information 160 (see FIG. 18) includes a RAM disk compression algorithm, which in FIG. 19A is the compression algorithm A, and information of one set of path and size.

FIG. 19B illustrates an example state where the application has written data d2 with the compression algorithm B in the same RAM disk area 1200 as that illustrated in FIG. 19A. As illustrated in FIG. 19B, the RAM disk area 1200 in which the compression algorithm A has been mounted in FIG. 19A is remounted with the compression algorithm B. Then, the data d2 compressed by the compression algorithm B is written in the area remounted with the compression algorithm B. The data d1 that has been written before remounting holds the compression state by the compression algorithm A.

In the state illustrated in FIG. 19B, the RAM disk update information 162 of the mount information 160 is updated to information indicating the remounted compression algorithm B and the process being the remounting request source.

FIG. 19C illustrates an example state where the application has written data d3 with the compression algorithm C in the same RAM disk area 1200 as that illustrated in FIG. 19B. As illustrated in FIG. 19C, the RAM disk area 1200 in which the compression algorithm B has been mounted in FIG. 19B is remounted with the compression algorithm C. Then, the data d3 compressed by the compression algorithm C is written in the area remounted with the compression algorithm C. The data d1 that has been written before remounting with the compression algorithm C holds the compression state by the compression algorithm A and the data d2 holds the compression state by the compression algorithm B.

In the state illustrated in FIG. 19C, the RAM disk update information 162 of the mount information 160 is updated to information indicating the remounted compression algorithm C and the process being the remounting request source.

Next, descriptions are given below of a remounting procedure for selectively using the same RAM disk area by data of different compression algorithms. Each process specifies an optimum compression method for raw data in requesting writing of data in the RAM disk. In Variation 3, first, the RAM disk remounting module 209 (see FIG. 21) receives requests to mount the RAM disk with different compression algorithms from a plurality of processes, and performs remounting. Since the RAM disk remounting module 209 receives requests from a plurality of processes, the RAM disk remounting module 209 initially acquires a right of occupation.

Figure 20:
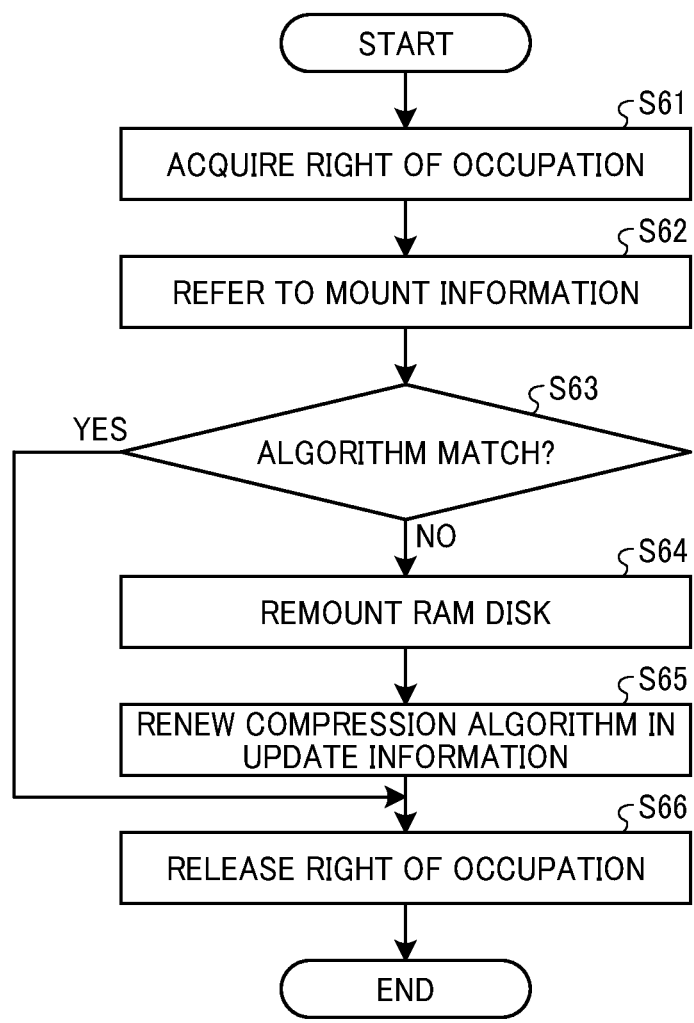
FIG. 20 is a flowchart illustrating an example remounting procedure performed by a RAM disk remounting module according to Variation 3.
Figure 21:
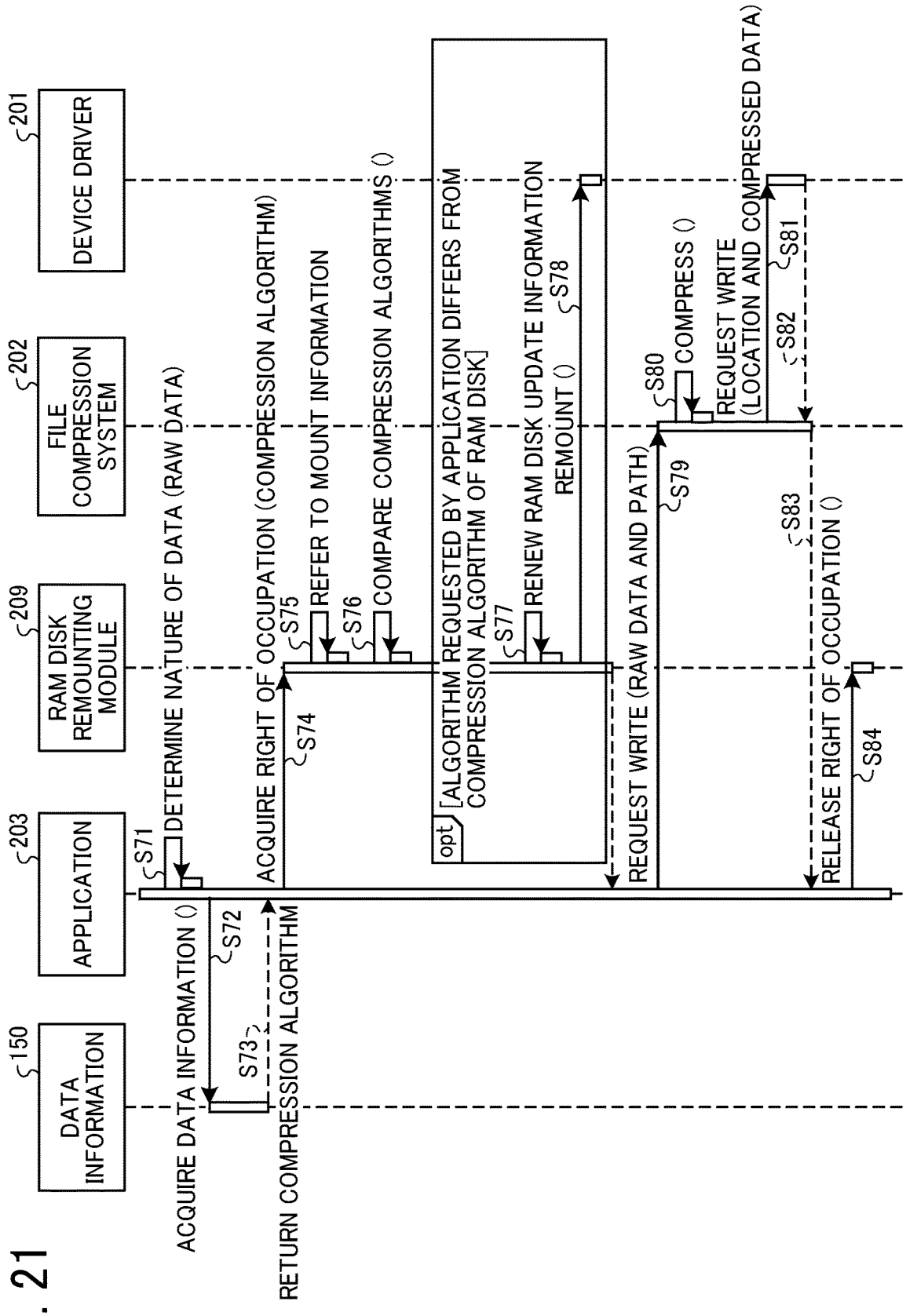
FIG. 21 is a sequence chart illustrating an example procedure for the application to write temporary files different in compression algorithm in the RAM disk area according to Variation 3.

FIG. 20 is a flowchart illustrating an example remounting procedure performed by the RAM disk remounting module 209 (see FIG. 21).

The RAM disk remounting module 209 first acquires the right of occupation and receives a request from one of the processes to be processed (S61). Notes that other processes are on standby until the right of occupation is released.

In response to the acquisition of the right of occupation, the RAM disk remounting module 209 refers to the mount information 160 (S62).

Subsequently, the RAM disk remounting module 209 determines whether remounting the RAM disk is necessary based on a request of, for example, data writing from the process (S63). Specifically, the RAM disk remounting module 209 determines whether the compression algorithm received from the process matches the latest compression algorithm recorded in the RAM disk update information 162 and determines that remounting is necessary when the compression algorithms do not match.

When the compression algorithms match (Yes at S63), the RAM disk remounting module 209 writes, in the RAM disk area, the data compressed by the compression algorithm requested by the process, without remounting (S64 and S65). Then, the RAM disk remounting module 209 releases the right of occupation (S66).

When the compression algorithms do not match (No at S63), the RAM disk remounting module 209 performs remounting at S64 and S65. Then, the RAM disk remounting module 209 writes, in the RAM disk area, the data compressed by the compression algorithm requested by the process and releases the right of occupation (S66).

In the remounting processing, at S64, the RAM disk remounting module 209 remounts the RAM disk at the mount point of the RAM disk. Further, the RAM disk remounting module 209 sets the path and the compression method in the attribute information 300 of the file compression system 202.

In addition, at S65, the RAM disk remounting module 209 renews the remounted compression algorithm and the process being the remounting request source in the RAM disk update information 162 of the mount information 160. The order of operations at S64 and S65 can be reversed.

FIG. 21 is a sequence chart illustrating an example procedure for the application 203 to write temporary files with different compression algorithms in the RAM disk area 1200.

First, the application 203 determines the nature of data to be written based on the raw data (S71).

Subsequently, the application 203 refers to the data information 150 and acquires the compression algorithm corresponding to the nature of the data (S72 and S73).

Subsequently, the application 203 requests the RAM disk remounting module 209 to acquire the right of occupation (S74). As a result, the RAM disk remounting module 209 acquires the right to occupy the application 203. When the right of occupation of another application has been acquired, the RAM disk remounting module 209 does not acquire the right of occupation of a different application before releasing the right of occupation of another application.

The RAM disk remounting module 209 refers to the mount information (S75) and compares the compression algorithms (S76). Specifically, the RAM disk remounting module 209 compares the compression algorithm received from the application 203 with the latest compression algorithm of the mount information 160 and determines the consistency therebetween.

In response to a determination that the compression algorithms do not match, the RAM disk remounting module 209 updates the RAM disk update information 162 of the mount information 160 (S77) and instructs the device driver 201 to perform remounting (S78).

In response to a determination that the compression algorithms match, S77 and S78 are skipped.

Based on the response from the RAM disk remounting module 209, the application 203 requests writing of data to the file compression system 202 (S79).

In response to reception of the data, the file compression system 202 compresses the data (S80) and requests the device driver 201 to write the data (S81 and S82).

In response to a reply from the device driver 201 to the data write request (S83), the application 203 releases the right of occupation of the RAM disk remounting module 209 (S84).

The procedure for the application 203 to read out the written temporary file is similar to the procedure illustrated in FIG. 14 with S51 omitted. In Variation 3, since the number of RAM disk area is one, there is only one predetermined path. Therefore, the operation at S51 can be omitted.

Although the number of RAM disk area is one in Variation 3, alternatively, a plurality of RAM disk areas can be set, and remounting of each RAM disk area can be performed.

Effect of Variation 3

In Variation 3, the RAM disk is remounted with a different compression algorithm. Accordingly, the same RAM disk area can be used selectively with a plurality of compression algorithms. This configuration can obviate dividing the RAM disk area per compression algorithm, and the RAM disk area can be efficiently used.

Variation 4

The information processing apparatus can be configured to switch the compression algorithm of long-stay data to a compression algorithm with a high compression ratio. In Variation 4, descriptions are given below of an example in which one RAM disk area is remounted as described in Variation 3 to switch the compression algorithm of the long-stay data to a compression algorithm with a higher compression ratio. Note that, in the description below, mainly the differences from the above-described embodiment and other variations will be described, and illustration and description similar to those of the above-described embodiment and other variations will be omitted.

The software configuration of the SSD 13 according to Variation 4 further includes the data information 150 (see FIG. 22) and the RAM disk management program 171 in addition to the above-described software configuration illustrated in FIG. 2. Further, the configuration of the RAM disk creation program 101 is different.

The data information 150 is information in which a data type is associated with compression algorithms. In Variation 4, a plurality of compression algorithms with different priorities can be set in the configuration illustrated in FIG. 11 according to Variation 1. A configuration example of the data information 150 will be described later with reference to FIG. 22.

The RAM disk management program 171 is a module program to add a function for managing the RAM disk, to the kernel. The RAM disk creation program 101 includes, in addition to the program for creating the RAM disk, a program for remounting the RAM disk and mount information. The operation of the entire information processing apparatus 1 according to each program will be described later with reference to FIG. 24. Since the configuration of the mount information has already been described in Variation 3, a detailed description thereof will be omitted.

Variation 4 differs from the embodiment and the other variations mainly in the configuration of the data information 150 and the operation of the entire information processing apparatus 1 in compressing long-stay data with a higher compression ratio by remounting, which will be described in detail below.

Data Information

FIG. 22 illustrates an example data configuration of the data information 150 according to Variation 4. As illustrated in FIG. 22, in the data information 150, the data type t151 is associated with both a first compression algorithm t152-1 and a second compression algorithm t152-2. As the data type t151, information indicating the nature of the data is specified similar to Variation 1. As the first compression algorithm t152-1, a compression algorithm suitable for the data type t151 is set as a first priority compression algorithm. As the second compression algorithm t152-2, one with a higher compression ratio of available compression algorithms is set. The second compression algorithm t152-2 is applied when the free space of the RAM disk is smaller than a predetermined threshold, which can be empirically obtained and stored in a memory. When the load on the CPU and the like are not considered, the second compression algorithm can be the one with a highest compression ratio of the applicable compression algorithms.

In this example, a compression algorithm corresponding to the data type is set as the first compression algorithm t152-1. The second compression algorithm t152-2 is an algorithm with a higher compression ratio common to all data types. In FIG. 22, the second compression algorithm t152-2 is the compression algorithm A, the compression ratio of which is relatively high among the first compression algorithms.

State Transition of RAM Disk

FIGS. 23A, 23B, 23C, and 23D are diagrams illustrating an example state transition of the RAM disk area 1200 that changes in state each time the RAM disk is mounted with a different compression algorithm. The states illustrated in FIGS. 23A, 23B, and 23C correspond to the states illustrated in FIGS. 19A, 19B, and 19C, respectively. The state illustrated in FIG. 23D corresponds to a change in compression algorithm of the long-stay data, which is added in Variation 4.

Figure 23:
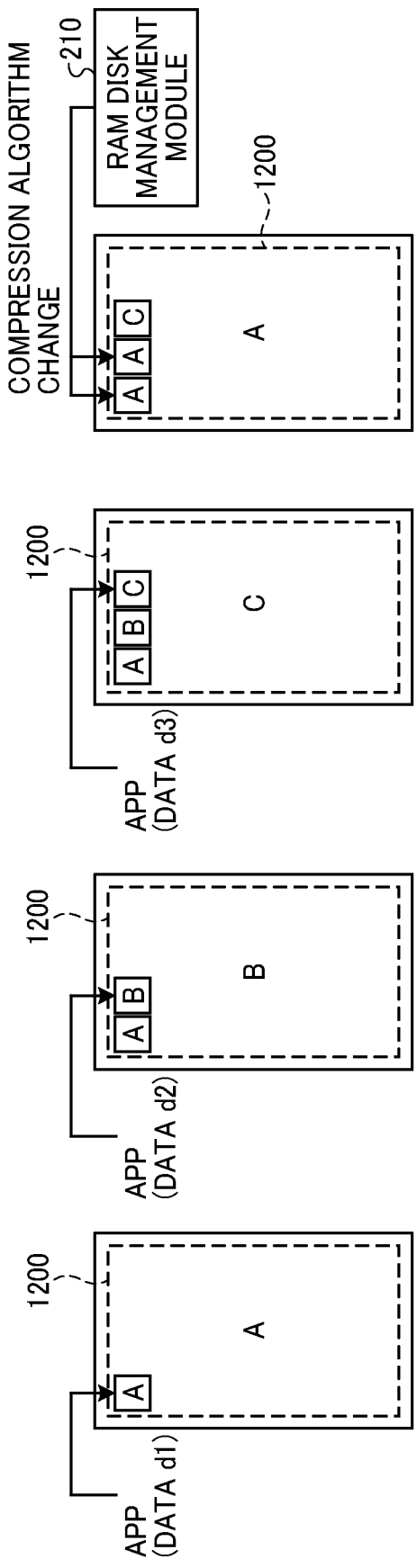
FIGS. 23A, 23B, 23C, and 23D are diagrams illustrating an example state transition of the RAM disk area that changes in state each time the RAM disk is mounted with a different compression algorithm, according to Variation 4.

FIG. 23A illustrates a state in which the data d1 compressed by the compression algorithm A is written in the RAM disk area 1200 after the compression algorithm A is mounted.

FIG. 23B illustrates a state where the application has written the data d2 with the compression algorithm B in the same RAM disk area 1200 as that illustrated in FIG. 23A.

FIG. 23C illustrates a state where the application has written the data d3 with the compression algorithm C in the same RAM disk area 1200 as that illustrated in FIG. 23B.

In this way, the data d1, the data d2, and the data d3 are sequentially written in the RAM disk area 1200. Assume that the RAM disk management module 210 determines the data d1 and the data d2 as long-stay data. In that case, each long-stay data is decompressed, and the RAM disk is remounted with the compression algorithm having the highest compression ratio (compression algorithm A in this example). Then, the long-stay data compressed again by the compression algorithm A is written in the RAM disk area 1200 (the long-stay data is rewritten with highly compressed data of the same content).

FIG. 23D illustrates the state where the data d1 and data d2, which the RAM disk management module 210 has determined as long-stay data, has been compressed again with the compression algorithm A and rewritten in the same RAM disk area 1200 as that illustrated in FIG. 23C. As illustrated in FIGS. 23A to 23D, the RAM disk area 1200 mounted with the compression algorithm C in FIG. 23C is remounted with the compression algorithm A in FIG. 23D, and the data d1 and the data d2 compressed by the compression algorithm A are rewritten in the RAM disk area 1200. Note that the data d1 and d2 keep the compression state even after the RAM disk area 1200 is remounted with another compression algorithm.

Further, the RAM disk update information 162 (see FIG. 18) is updated with information indicating the compression algorithm A used in the last remounting and the process being the remounting request source.

Operation of Entire Information Processing Apparatus

Figure 24:
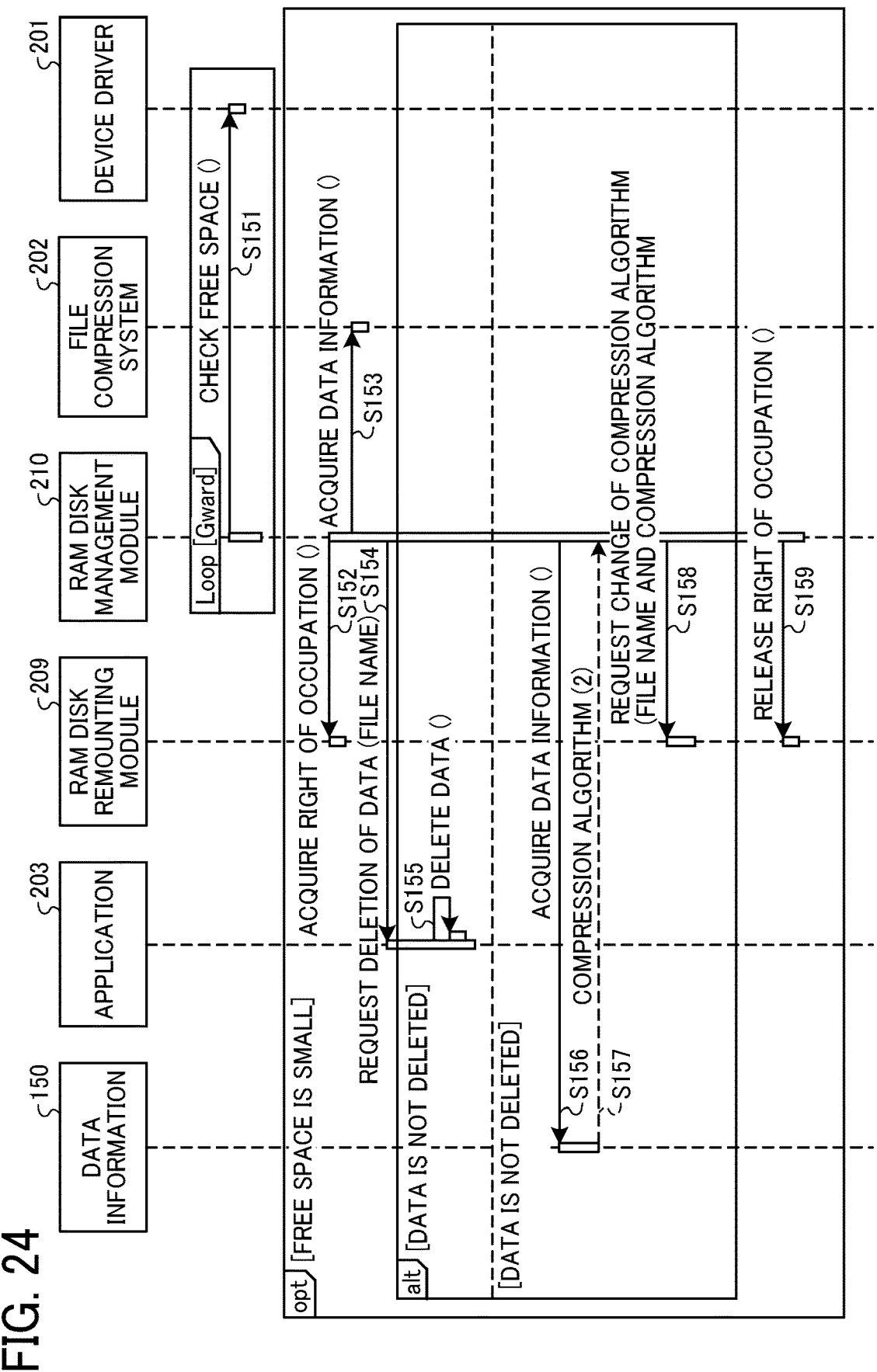
FIG. 24 is a sequence chart illustrating an example operation of the entire information processing apparatus to highly compress long-stay data by remounting, according to Variation 4.

FIG. 24 is a sequence chart illustrating an example operation of the entire information processing apparatus 1 to highly compress long-stay data by remounting.

First, the RAM disk management module 210 checks the free space of the RAM disk area 1200 to the device driver 201 at predetermined intervals (S151). The predetermined intervals can be empirically obtained and stored in a memory.

Assume that the RAM disk management module 210 determines that the free space of the RAM disk area 1200 is smaller than the predetermined threshold at S151. In that case, the RAM disk management module 210 requests the RAM disk remounting module 209 to acquire the right of occupation (S152). In response to an acquisition of the right of occupation, the RAM disk management module 210 checks whether there is long-stay data in the RAM disk area 1200 and acquires the data information (long-stay data) from the file compression system 202 (S153).

Subsequently, the RAM disk management module 210 performs, separately, processes of deleting the data and processes of not deleting the data. Whether or not to delete data is determined depending on, for example, whether the currently designated compression algorithm can be changed to a compression algorithm with a higher compression ratio.

First, the processes of deleting data will be described. In the case of deleting data, the RAM disk management module 210 notifies the application (e.g., the application 203) that has written the long-stay data of a file name of the long-stay data and requests deletion of the data (S154). In response to the request, the application 203 deletes the data (S155).

By contrast, when deleting the data is not executable, the RAM disk management module 210 acquires the data information from the data information 150 (S156 and S157). Then, when the long-stay data is compressed by the first compression algorithm, the RAM disk management module 210 requests the RAM disk remounting module 209 to change the compression algorithm to the second compression algorithm (S158). In response to the request for changing the algorithm, the RAM disk remounting module 209 remounts the RAM disk with the first compression algorithm to acquire the long-stay data, further remounts the RAM disk with the second compression algorithm, and writes the long-stay data in the remounted RAM disk.

After the data compressed by the second compression algorithm is written at S158, the RAM disk management module 210 releases the right of occupation of the RAM disk remounting module 209 (S159).

Effect of Variation 4

Long-stay data in the RAM disk weighs the capacity of the RAM disk and limits the amount of data that can be written to the RAM disk. Since the RAM disk is a volatile memory, data in the RAM disk will disappear when the power is turned off.

However, according to Variation 4, when there is data staying long in the RAM disk, the compression algorithm is changed to a compression algorithm of a higher compression ratio, or the data is deleted from the RAM disk. Accordingly, the amount of data writable into the RAM disk can be increased.

Variation 5

In an information processing apparatus connectable to a network and having a network storage, data stored in a RAM disk can be modified so as to be stored in the network storage to abide there. Descriptions are given below of storing data inside a RAM disk into an external storage (e.g., a network storage or a secondary storage device).

Figure 25:
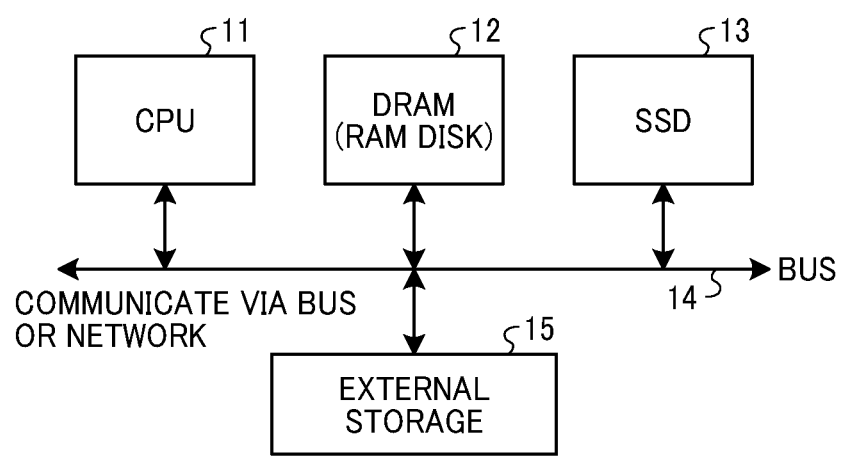
FIG. 25 is a block diagram illustrating an example hardware configuration according to Variation 5.

FIG. 25 is a block diagram illustrating an example hardware configuration according to Variation 5. FIG. 25 illustrates an example configuration in which the CPU 11, the DRAM 12 (the RAM disk), the SSD 13, and an external storage 15 are connected via the bus 14. The external storage 15 is a network storage or a secondary storage device. Examples of the secondary storage device include a Secure Digital (SD) card (registered trademark) and a Universal Serial Bus (USB) medium. When the external storage 15 is a network storage, the CPU 11 communicates with the external storage on the network via a network communication interface.

FIG. 26 is a sequence chart illustrating an example procedure for saving the data of the RAM disk of the DRAM 12 in the external storage 15.

First, the RAM disk management module 210 requests the file compression system 202 to acquire the data information of the RAM disk (S201). The data information can be either predetermined data that is a portion of data in the RAM disk or entire data in the RAM disk.

Subsequently, a sequence for acquiring data of the RAM disk is performed (S202). The sequence for acquiring the data of the RAM disk is similar to the sequence described in the other variations. Since an example of such sequence is described in detail in other variations, an illustration and a description thereof are omitted here.

Subsequent to S202, the RAM disk management module 210 requests the file compression system 202 to store the acquired data in the external storage 15 (S203). In response to this request, the file compression system 202 stores the data in the external storage 15 (S205).

Effect of Variation 5

Storing the data of the RAM disk into the external storage is advantageous in that the data can permanently exist even after the information processing apparatus 1 is turned off. Therefore, after the information processing apparatus 1 is activated again, the data in the RAM disk can be recovered. Further, in a configuration to move a part of the data in the RAM disk to the external storage, the free area in the RAM disk is increased, thus increasing the amount of data writable in the RAM disk.

Programs to be executed on the information processing apparatus according to the above-described embodiment or the information processing apparatuses according to variations can be recorded, as a file installable or executable by a computer, on a computer-readable recording medium, such as a compact disc-read only memory (CD-ROM), a flexible disk (FD), a compact disc-recordable (CD-R), or a digital versatile disk (DVD) and provided therefrom.

Such a program to be executed on the apparatus according to the above-described embodiment or a variation thereof can be stored on a computer connected to a network, such as the Internet, to be downloaded from the computer via the network. Alternatively, such a program executed on the apparatus according to the above-described embodiment or a variation thereof can be provided or distributed via a network, such as the Internet.

Alternatively, such a program executed on the apparatus according to the above-described embodiment or a variation thereof can be incorporated in a random access memory (ROM) or the like preliminarily.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention. Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an ASIC (Application Specific Integrated Circuit), DSP (Digital Signal Processor), FPGA (Field Programmable Gate Array) and conventional circuit components arranged to perform the recited functions.

What is claimed is:

1. An information processing apparatus comprising:
a random access memory (RAM);
a non-volatile memory storing setting information including a plurality of compression methods associated with a plurality of RAM disks;
processing circuitry configured to:
create the plurality of RAM disks, each of the plurality of RAM disks including at least one of the plurality of compression methods mounted on the respective RAM disk according to the setting information;
write data into a corresponding RAM disk of the plurality of RAM disks in response to a writing request from an application, the corresponding RAM disk being based on the application and the compression method mounted to the corresponding RAM disk;
compress the data based on the compression method mounted on the corresponding RAM disk;
designate one RAM disk of the plurality of RAM disks as a writing destination of the data based on a type of data of the application and the compression method mounted to the corresponding RAM disk;
write the data to the one RAM disk according to the compression method mounted on the one RAM disk; and
read data from the corresponding RAM disk of the plurality of RAM disks corresponding to the application, in response to a read request from the application.

2. The information processing apparatus according to claim 1,
wherein the RAM includes a dynamic RAM (DRAM), and wherein the processing circuitry is configured to create a storage area for each of the plurality of RAM disks in a part of the DRAM according to the setting information.

3. The information processing apparatus according to claim 1,
wherein the plurality of compression methods includes a method of not compressing the data, and
wherein, the processing circuitry is configured to
designate a RAM disk mounted with the method of not compressing the data as a writing destination in response to a writing request of data that has been compressed, and
omit compressing and write the compressed data into the designated RAM disk.

4. The information processing apparatus according to claim 1,
wherein the processing circuitry is configured to designate the compression method corresponding to a type of the data for each file of the application, and
wherein the non-volatile memory stores file management information specifying one of the plurality of RAM disks mounted with the designated compression method as a writing destination for each file name of the data of the application.

5. The information processing apparatus according to claim 4,
wherein the processing circuitry is configured to:
determine the type of the data for each file of the application; and
designate the compression method corresponding to the type of the data for each file of the application, based on data information associating the type of the data with at least one compression method.

6. The information processing apparatus according to claim 4,
the processing circuitry is configured to:
retrieve the data from the writing destination in response to a reading request of the data from the application; and
decompress the data according to the compression method mounted on the writing destination.

7. The information processing apparatus according to claim 1,
wherein the processing circuitry is configured to:
manage a free area of the plurality of RAM disks; and
increase the free area of the plurality of RAM disks by deleting data that has been stored for a threshold time.

8. The information processing apparatus according to claim 1,
wherein the processing circuitry is configured to increase a free area of a first RAM disk of the plurality of RAM disks by moving the data stored in the first RAM disk to a second RAM disk of the plurality of RAM disks.

9. The information processing apparatus according to claim 1,
wherein the processing circuitry is configured to store the data written in the RAM disk to a secondary storage.

10. The information processing apparatus according to claim 1, wherein the processing circuitry is configured to store the data written in the RAM disk in a network storage via a network.

11. An information processing apparatus comprising:
a random access memory (RAM);
a non-volatile memory storing setting information including a compression method of a RAM disk; and
processing circuitry configured to:
create, in the RAM, the RAM disk mounted with the compression method according to the setting information;
determine whether a compression method designated for data matches the compression method mounted on the RAM disk, in response to a writing request of the data from an application, the writing request designating the compression method corresponding to the data;
remount the RAM disk with the compression method designated for the data in response to a determination that the compression method designated for the data does not match the compression method of the RAM disk;
write the data into the RAM disk in response to a determination that the compression method designated for the data matches the compression method of the RAM disk; and
read data from the RAM disk in response to a read request from the application.

12. The information processing apparatus according to claim 11, wherein the processing circuitry is configured to:
determine whether the compression method designated for the data matches the compression method mounted on the RAM disk each time the processing circuitry requests writing of the data in the RAM disk; and
remount the RAM disk with the compression method designated for the data in response to the determination that the compression method designated for the data does not match the compression method of the RAM disk.

13. The information processing apparatus according to claim 11, wherein,
each time the processing circuitry remounts the RAM disk with a different compression method, the processing circuitry is configured to write, into the RAM disk, the data corresponding to the different compression method.

14. The information processing apparatus according to claim 11,
wherein the processing circuitry is configured to:
determine whether a free area of the RAM disk is smaller than a threshold; and
rewrite data compressed with a first compression method in the RAM disk with data compressed with a second compression method higher in compression ratio than the first compression method, in response to a determination that the free area of the RAM disk is smaller than the threshold.

* * * * *